(12) United States Patent
Yasunaga et al.

(10) Patent No.: US 7,973,975 B2
(45) Date of Patent: Jul. 5, 2011

(54) IMAGE PROCESSING APPARATUS AND IMAGE PROCESSING METHOD

(75) Inventors: Masaaki Yasunaga, Mishima (JP); Nobuhiko Nakahara, Susono (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 635 days.

(21) Appl. No.: 12/060,681

(22) Filed: Apr. 1, 2008

(65) Prior Publication Data
US 2009/0244562 A1 Oct. 1, 2009

(51) Int. Cl.
*G06K 15/00* (2006.01)
(52) U.S. Cl. ...... 358/3.06; 358/1.9; 358/3.01; 358/3.21; 382/166; 382/232
(58) Field of Classification Search ............ None
See application file for complete search history.

(56) References Cited

U.S. PATENT DOCUMENTS

| | | | | |
|---|---|---|---|---|
| 5,398,118 A * | 3/1995 | Satoh et al. | ............ | 358/3.2 |
| 6,154,568 A * | 11/2000 | Chen et al. | ............ | 382/232 |
| 6,252,679 B1 * | 6/2001 | Wang | ............ | 358/1.9 |
| 6,393,060 B1 * | 5/2002 | Jeong | ............ | 375/240.19 |
| 2002/0097415 A1 * | 7/2002 | Chang et al. | ............ | 358/1.13 |
| 2006/0132811 A1 * | 6/2006 | Case | ............ | 358/1.9 |
| 2006/0193005 A1 * | 8/2006 | Kato | ............ | 358/1.15 |

FOREIGN PATENT DOCUMENTS

JP 61-176253 8/1986

* cited by examiner

*Primary Examiner* — Chan S Park
*Assistant Examiner* — Javier J Ramos
(74) *Attorney, Agent, or Firm* — Turocy & Watson, LLP

(57) ABSTRACT

An image processing apparatus includes an image input device to convert image data into uncompressed data of CMYK, a gradation processing device to perform a gradation process on the uncompressed data to generate a halftone image, a rearrangement determination device to determine necessity of rearrangement of pixels of the halftone image, a selector to select an output destination based on a rearrangement necessity determination result, a rearrangement device to rearrange the pixels by using a threshold table used at a time of execution of the gradation process of the halftone image, and a coding device to output data obtained by coding data of the halftone image. According to the image processing device, coding efficiency can be improved more than in the related art while a harmful effect (reduction in code amount) due to the rearrangement process is suppressed.

19 Claims, 13 Drawing Sheets

IMAGE BEFORE REARRANGEMENT

| 1 | 0 | 0 | 1 | 1 | 0 | 0 | 1 |
|---|---|---|---|---|---|---|---|
| 0 | 1 | 1 | 0 | 0 | 1 | 1 | 0 |
| 0 | 1 | 1 | 0 | 0 | 1 | 1 | 0 |
| 1 | 0 | 0 | 1 | 1 | 0 | 0 | 1 |
| 1 | 0 | 0 | 1 | 1 | 0 | 0 | 1 |
| 0 | 1 | 1 | 0 | 0 | 1 | 1 | 0 |
| 0 | 1 | 1 | 0 | 0 | 1 | 1 | 0 |
| 1 | 0 | 0 | 1 | 1 | 0 | 0 | 1 |

NUMBER OF CHANGE POINTS: 39

IMAGE AFTER REARRANGEMENT

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |

NUMBER OF CHANGE POINTS: 16

FIG. 4A

IMAGE BEFORE REARRANGEMENT

| 0 | 0 | 1 | 1 | 1 | 1 | 0 | 0 |
|---|---|---|---|---|---|---|---|
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |
| 0 | 0 | 1 | 1 | 1 | 1 | 0 | 0 |

NUMBER OF CHANGE POINTS: 16

IMAGE AFTER REARRANGEMENT

| 1 | 0 | 1 | 0 | 1 | 0 | 0 | 1 |
|---|---|---|---|---|---|---|---|
| 0 | 1 | 1 | 0 | 1 | 0 | 0 | 1 |
| 1 | 0 | 1 | 0 | 1 | 0 | 0 | 1 |
| 0 | 1 | 1 | 0 | 1 | 0 | 0 | 1 |
| 1 | 0 | 1 | 0 | 1 | 0 | 0 | 1 |
| 0 | 1 | 1 | 0 | 1 | 0 | 0 | 1 |
| 1 | 0 | 1 | 0 | 1 | 0 | 0 | 1 |
| 0 | 1 | 1 | 0 | 1 | 0 | 0 | 1 |

NUMBER OF CHANGE POINTS: 48

| 1 | 5 | 4 | 3 | 1 | 5 | 4 | 3 |
|---|---|---|---|---|---|---|---|
| 7 | 0 | 2 | 6 | 7 | 0 | 2 | 6 |
| 4 | 3 | 1 | 5 | 4 | 3 | 1 | 5 |
| 2 | 6 | 7 | 0 | 2 | 6 | 7 | 0 |
| 1 | 5 | 4 | 3 | 1 | 5 | 4 | 3 |
| 7 | 0 | 2 | 6 | 7 | 0 | 2 | 6 |
| 4 | 3 | 1 | 5 | 4 | 3 | 1 | 5 |
| 2 | 6 | 7 | 0 | 2 | 6 | 7 | 0 |

REARRANGEMENT IN ASCENDING ORDER FOR EACH ROW →

| 1 | 1 | 3 | 3 | 4 | 4 | 5 | 5 |
|---|---|---|---|---|---|---|---|
| 0 | 0 | 2 | 2 | 6 | 6 | 7 | 7 |
| 1 | 1 | 3 | 3 | 4 | 4 | 5 | 5 |
| 0 | 0 | 2 | 2 | 6 | 6 | 7 | 7 |
| 1 | 1 | 3 | 3 | 4 | 4 | 5 | 5 |
| 0 | 0 | 2 | 2 | 6 | 6 | 7 | 7 |
| 1 | 1 | 3 | 3 | 4 | 4 | 5 | 5 |
| 0 | 0 | 2 | 2 | 6 | 6 | 7 | 7 |

FIG. 5B

| 1 | 0 | 0 | 1 | 1 | 0 | 0 | 1 |
|---|---|---|---|---|---|---|---|
| 0 | 1 | 1 | 0 | 0 | 1 | 1 | 0 |
| 0 | 1 | 1 | 0 | 0 | 1 | 1 | 0 |
| 1 | 0 | 0 | 1 | 1 | 0 | 0 | 1 |
| 1 | 0 | 0 | 1 | 1 | 0 | 0 | 1 |
| 0 | 1 | 1 | 0 | 0 | 1 | 1 | 0 |
| 0 | 1 | 1 | 0 | 0 | 1 | 1 | 0 |
| 1 | 0 | 0 | 1 | 1 | 0 | 0 | 1 |

REARRANGEMENT PROCESS SIMILAR TO REARRANGEMENT (FIG. 5A) OF THRESHOLD →

| 1 | 1 | 1 | 1 | 0 | 0 | 0 | 0 |
|---|---|---|---|---|---|---|---|
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |
| 1 | 1 | 1 | 1 | 0 | 0 | 0 | 0 |

IMAGE PROCESSING APPARATUS AND IMAGE PROCESSING METHOD

BACKGROUND OF THE INVENTION

1. Field of the Invention

The present invention relates to an apparatus and a method for performing a data processing on image data, and particularly to an image processing apparatus and an image processing method in which coding efficiency is improved while a harmful effect due to a rearrangement process is suppressed.

2. Related Art

As the resolution of a printed image becomes high, a technique for effectively coding the increased data at the time of printing and compressing the data becomes important. Thus, in an image processing apparatus and an image processing method of the related art, from the viewpoint of picture quality and code amount, a halftone process or the like is performed so that multi-value expression can be apparently made though the image is binary, and the data in which the data amount is reduced is transferred or is once stored in a hard disk drive (HDD).

For example, in JP-A-61-176253, as an example of the image processing apparatus and the image processing method of the related art, there is disclosed a technique in which the efficiency of a coding process is improved by rearranging an image expressed in multi-valued image by utilizing a dither method.

However, in the image processing apparatus and the image processing method of the related art, when the rearrangement process is indiscriminately performed on the image expressed in multi-valued image, contrary to the original object, there is a case where the coding efficiency becomes lower than before the image processing.

Then, it is desired to provide an image processing apparatus and an image processing method in which the coding efficiency is improved while the harmful effect (reduction in code amount) due to the rearrangement process is suppressed.

SUMMARY OF THE INVENTION

The present invention has been made in view of the above circumstances, and it is an object to provide an image processing apparatus and an image processing method in which the coding efficiency is improved while the harmful effect (reduction in code amount) due to the rearrangement process is suppressed.

According to an aspect of the invention, an image processing apparatus includes an image input device to convert image data into uncompressed data of C (Cyan), M (Magenta), Y (Yellow) and K (Black), a gradation processing device to perform a gradation process on the uncompressed data converted by the image input device and to generate a halftone image, a rearrangement determination device to determine necessity of rearrangement of pixels of the halftone image generated by the gradation processing device, a selector to select an output destination based on a rearrangement necessity determination result determined by the rearrangement determination device, a rearrangement device to rearrange the pixels by using a threshold table used at the time of performing the gradation process of the halftone image generated by the gradation processing device, and a coding device to output data obtained by coding data of the halftone image generated by the gradation processing device and data of the halftone image rearranged by the rearrangement device.

According to another aspect of the invention, an image processing method includes converting inputted image data into uncompressed data of C (Cyan), M (Magenta), Y (Yellow) and K (Black), performing a gradation process on the converted uncompressed data to generate a halftone image, determining necessity of rearrangement of pixels of the halftone image generated in the gradation process, rearranging the pixels of the halftone image in a case where the rearrangement necessity determination result is that the rearrangement is necessary, and outputting data obtained by coding data of the halftone image generated in the gradation process and data of the halftone image in which the pixels are rearranged in the pixel rearrangement.

Therefore, according to the image processing apparatus and the image processing method of the invention, the coding efficiency can be improved while the harmful effect (reduction in code amount) due to the rearrangement process is suppressed.

BRIEF DESCRIPTION OF THE DRAWINGS

In the accompanying drawings,

FIG. 4A is a view illustrating an example of a case where a rearrangement determination device of the image processing apparatus of the first embodiment of the invention determines that rearrangement is necessary, FIG. 4B is a view illustrating an example of a case where the rearrangement determination device of the image processing apparatus of the first embodiment of the invention determines that rearrangement is unnecessary, FIG. 5A is a view for explaining rearrangement for a threshold table of the image processing apparatus of the first embodiment of the invention, FIG. 5B is a view for explaining rearrangement for a halftone image inputted to a rearrangement device of the image processing apparatus of the first embodiment of the invention.

DETAILED DESCRIPTION OF THE INVENTION

Embodiments of an image processing apparatus of the invention will be described with reference to the accompanying drawings.

Figure 1:
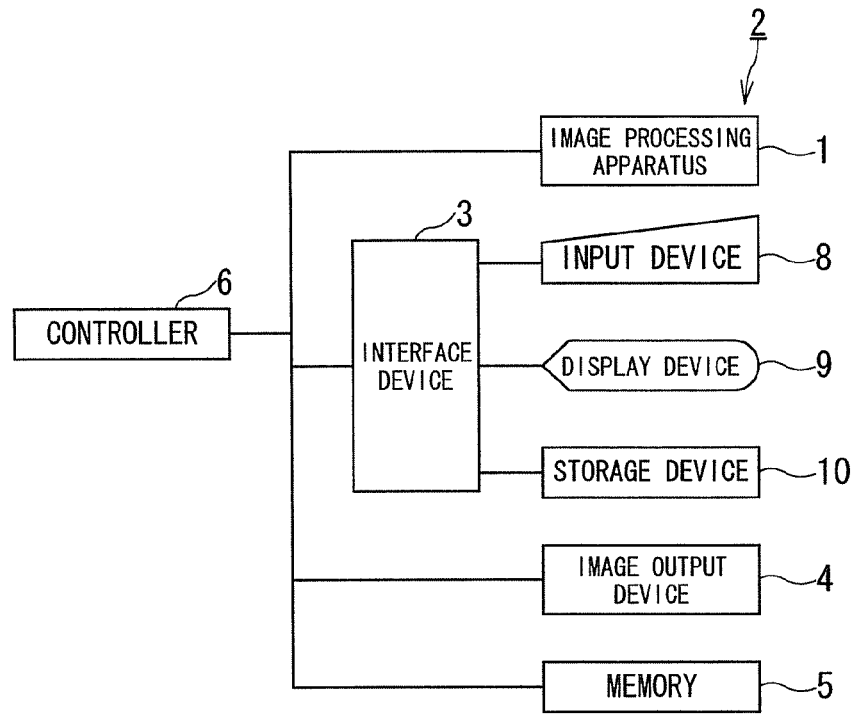
FIG. 1 is a view schematically illustrating an applied example of an image processing apparatus of an embodiment of the invention.

FIG. 1 is a schematic view schematically illustrating an applied example of an image processing apparatus 1 of the invention.

As shown in FIG. 1, the image processing apparatus 1 is applied as one component of, for example, an image forming apparatus 2. That is, the image forming apparatus 2 includes a general image forming apparatus and the image processing apparatus 1.

The image forming apparatus 2 to which the image processing apparatus 1 is applied includes, in addition to the image processing apparatus 1, an interface device 3 for connection with an equipment, an image output device 4 to output an image, a memory 5, such as a RAM and a VRAM, to store electronic information, and a controller 6 to control the image processing apparatus 1, the interface device 3, the image output device 4 and the memory 5.

The controller 6 is connected to the image processing apparatus 1, the interface device 3, the image output device 4 and the memory 5 through a transmission path 7 through which a signal and electronic information can be transmitted, and the controller 6 can control the image processing apparatus 1, the interface device 3, the image output device 4 and the memory 5.

The interface device 3 is connected through the transmission path 7 to an input device 8 as a man-machine interface, a display device 9 as an example of an output apparatus, and a storage device 10, such as a hard disk drive (hereinafter, referred to as HDD), to store electronic information. The controller 6 can control, through the transmission path 7 and the interface device 3, the input device 8, the display device 9 and the storage device 10 connected to the interface device 3. In other words, the image forming apparatus 2 is configured by including the image processing apparatus 1, the interface device 3, the image output device 4, the memory 5, the input device 8, the display device 9, the storage device 10 and the controller 6.

Incidentally, in the image forming apparatus 2, at least one of the input device 8, the display device 9 and the storage device 10 may be connected to the controller 6 without the intervention of the interface device 3. Besides, the image forming apparatus 2 may include the storage device 10.

Next, respective embodiments (examples) of the image processing apparatus 1 will be described.

First Embodiment

Figure 2:
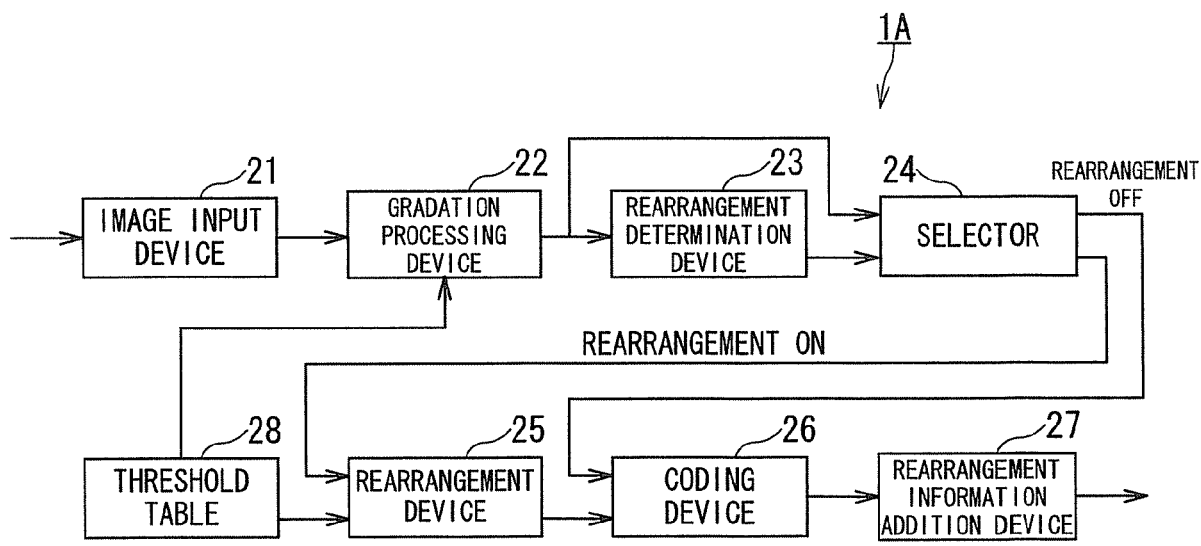
FIG. 2 is a view schematically illustrating a structure of an image processing apparatus of a first embodiment of the invention.

FIG. 2 is a schematic view schematically illustrating a structure of an image processing apparatus 1A as an example of an image processing apparatus of a first embodiment of the invention.

The image processing apparatus 1A includes an image input device 21 to convert image data into bitmap data (uncompressed data) of C (Cyan), M (Magenta), Y (Yellow) and K (Black), a gradation processing device 22 to perform a gradation process on the bitmap data (uncompressed data) converted by the image input device 21 and to generate a halftone image, a rearrangement determination device 23 to determine necessity of rearrangement of the halftone image generated by the gradation processing device 22, a selector 24 to select an output destination according to a determination result of the rearrangement determination device 23, a rearrangement device 25 to rearrange the halftone image generated by the gradation processing device 22, a coding device 26 to code data of an image (hereinafter, referred to as a rearranged image) after the rearrangement device 25 rearranges the halftone image or data of the halftone image generated by the gradation processing device 22, and a rearrangement information addition device 27 to add information (hereinafter, referred to as rearrangement information) indicating the presence or absence of the rearrangement and data used at the time of the rearrangement. Further, a threshold table 28 is stored in a data storage area such as, for example, the memory 5 shown in FIG. 1, and is stored in such a state that the gradation processing device 22, the rearrangement determination device 23 and the rearrangement device 25 can refer to it.

The image input device 21 has a function to convert the image (image data) into the bitmap data (uncompressed data) and a function to convert the color coordinate system of the image into four color planes of C, M, Y and K.

The image input device 21 converts the image (image data) into the bitmap data and converts the color coordinate system into CMYK, and transmits the bitmap data after the conversion to the gradation processing device 22.

The image data is roughly classified into raster form, such as JPEG or GIF, in which two-dimensional image formation is stored as lattice-like dots (collection of dots), and vector form in which information of dots, lines and planes is stored. Even if an image of either of the raster form and the vector form is inputted, the image input device 21 can convert it into the bitmap data.

The gradation processing device 22 has a function to perform the gradation process on the bitmap data and to generate the halftone image, and transmits the data of the halftone image obtained by performing the gradation process on the bitmap data to the rearrangement determination device 23. When the gradation processing device 22 performs the gradation process, reference is made to the threshold table 28.

The rearrangement determination device 23 determines the necessity of rearrangement of pixels based on the halftone image (image before the rearrangement) transmitted from the gradation processing device 22 and the rearranged image (image after the rearrangement is performed by referring to the threshold table 28). The necessity of the rearrangement is determined based on whether or not a harmful effect such as reduction in coding efficiency is generated by performing the rearrangement.

The selector 24 has a function to change the output destination of the data of the inputted halftone image based on the necessity of the rearrangement (determination result) determined by the rearrangement determination device 23. In the case where the rearrangement determination device 23 determines that the rearrangement is necessary, the selector 24 selects the rearrangement device 25 as the data output destination, and in the case where the rearrangement determination device 23 determines that the rearrangement is unnecessary, the selector selects the coding device 26 as the data output destination, and outputs the data of the inputted halftone image to the selected output destination.

The rearrangement device 25 has a function to rearrange pixels of image data. The rearrangement device 25 refers to the threshold table 28, uses the threshold table 28 referred to, and rearranges (rearrangement process) the pixels in the halftone image generated by the gradation processing device 22. The rearrangement device 25 transmits data of the rearranged image generated by executing the rearrangement process to the coding device 26.

The coding device 26 has a function to code data, and codes the data of the rearranged image received from the rearrangement device 25 in the case where the rearrangement process is executed, and codes the data of the halftone image transmitted from the gradation processing device 22 in the case where the rearrangement process is not executed. The coding device 26 transmits the data (hereinafter, referred to as coded data) generated by coding the halftone image data to the rearrangement information addition device 27.

The rearrangement information addition device 27 has a function to add rearrangement information to the coded data generated by the coding device 26. The rearrangement information addition device 27 adds information indicating whether or not the rearrangement device 25 has performed the rearrangement of the pixels of the image data and indicating which data table is the threshold table 28 referred to at the time of the rearrangement, as the rearrangement information, to the coded data, and outputs the thus obtained data to, for example, the storage device 10 as an example of an external apparatus and stores it. The rearrangement information is used when the coded data is decoded.

Figure 3:
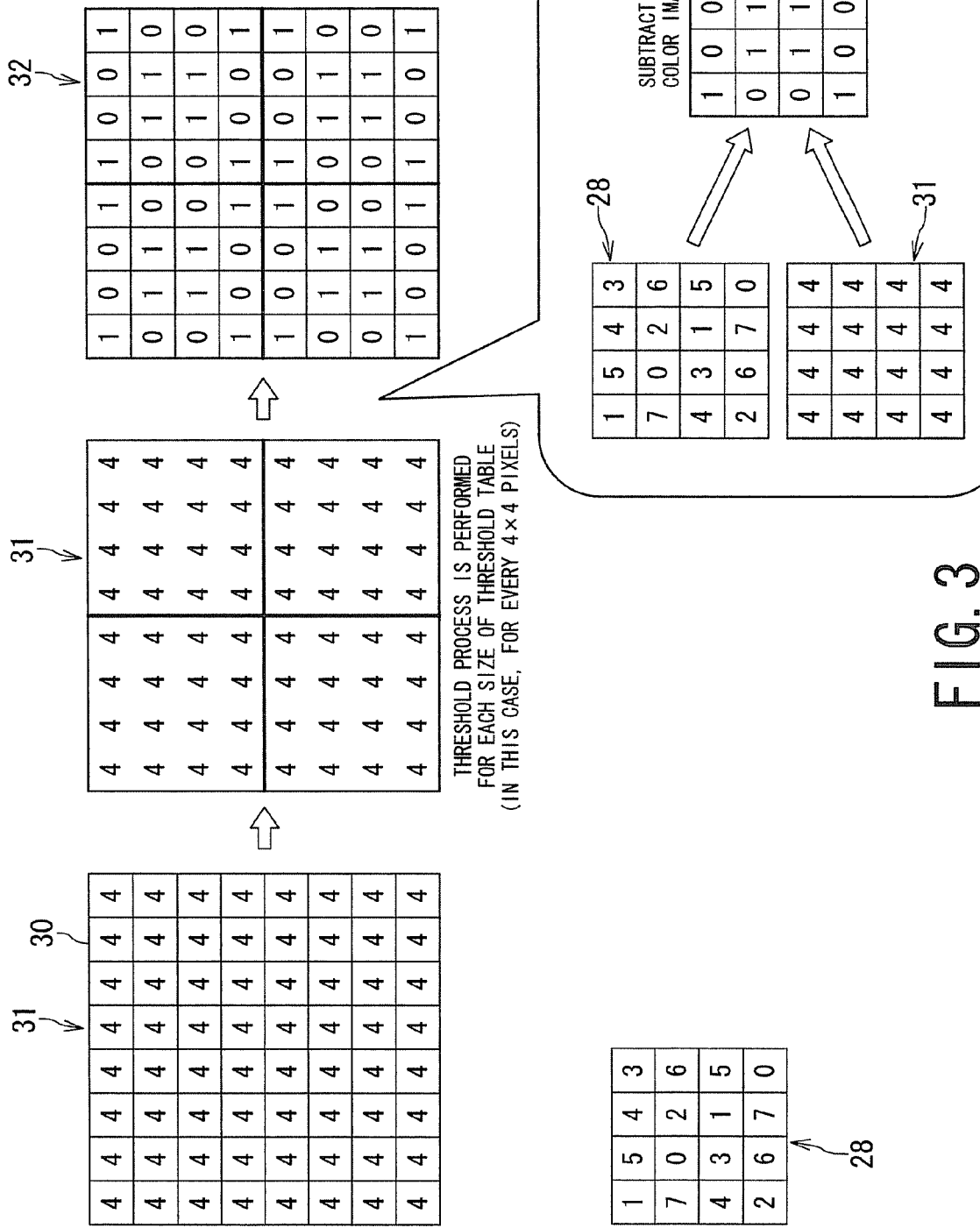
FIG. 3 is a view for explaining a gradation process performed by a gradation processing device of the image processing apparatus of the first embodiment of the invention.

FIG. 3 is an explanation view for explaining the gradation process performed by the gradation processing device 22 in the image processing apparatus 1A. Here, pixels 30 have colors of 3 bits (8 colors) and the colors are denoted by numerals of 0 to 7.

For example, as shown in FIG. 3, in the case where an input image (bitmap image) 31 has 8 pixels×8 pixels, and the threshold table 28 has 4 rows×4 columns, the gradation processing device 22 executes the gradation process. That is, comparison with threshold values is performed for each size of the threshold table 28, and 1 is outputted in the case where the numeral (0 to 7) to denote the color of the pixel 30 in the input image 31 is larger than the threshold (0 to 7) of the threshold table 28, and 0 is outputted in the case of smaller. Specifically, in the case of the pixel 30 located at the first row from the top and the first column from the left, the numerical value of the pixel 30 of the input image 31 is 4, and the threshold value of the threshold table 28 is 1, and accordingly, 1 is outputted. In the case of the pixel 30 located at its immediate right (the first row from the top and the second column from the left), the numerical value of the pixel 30 of the input image 31 is 4, and the threshold value of the threshold table 28 is 5, and accordingly, 0 is outputted.

As shown in FIG. 3, as a result that the gradation processing device 22 performs the gradation process on the respective pixels 30 of the input image 31, a 1-bit halftone image 32 (8 pixels×8 pixels) of 0 and 1 is obtained. Incidentally, the gradation process performed by the gradation processing device 22 includes not only the process of converting multi-gradation image data (multi-bit data) into 1-bit data as shown in FIG. 3, but also a process of converting it into data of 2 bits or more.

FIG. 4A and FIG. 4B are explanatory views for explaining the basis of the necessity determination of rearrangement performed by the rearrangement determination device 23. Specifically, FIG. 4A is a view exemplifying a case where the rearrangement determination device 23 determines that the rearrangement is necessary, and FIG. 4B is a view exemplifying a case where the rearrangement determination device 23 determines that the rearrangement is unnecessary.

As shown in FIG. 4A and FIG. 4B, the rearrangement determination device 23 pays attention to a point (hereinafter, referred to as a change point) where 0 and 1 are changed when the pixels 30 in the halftone image 32 are scanned, and determines the necessity of the rearrangement according to the increase/decrease of the change point.

The number of change points is the number of points where 0 and 1 are changed when the initial value is made 0 and all the pixels 30 are checked from, for example, the position of the first row and the first column (upper left) to the eighth row and the eighth column (lower right) in the row direction (lateral direction shown in FIG. 4A and FIG. 4B), that is, the number of times that 0 and 1 are changed. In the case of the image 32 before the rearrangement shown in FIG. 4A, when all pixels are checked like 0 (initial value)→1 (first row and first column)→0 (first row and second column)→0 . . . →0 (eighth row and seventh column)→1 (eighth row and eighth column), the number of times of 0→1 or 1→0 is 39, and accordingly, the number of change points is 39.

The rearrangement determination device 23 determines the necessity of the rearrangement in view of the point that as the number of change points becomes small, the effect of the rearrangement becomes large. That is, in the case where the change points are decreased by the rearrangement as in the case shown in FIG. 4A, the rearrangement determination device 23 determines that the rearrangement is necessary, and in the case where the change points are increased by the rearrangement as in the case shown in FIG. 4B, it determines that the rearrangement is unnecessary.

FIG. 5A and FIG. 5B are explanatory views for explaining the rearrangement process performed by the rearrangement device 25 in the image processing apparatus 1A. Specifically, FIG. 5A is an explanatory view for explaining the rearrangement for the threshold table 28, and FIG. 5B is an explanatory view for explaining the rearrangement for the halftone image 32 inputted to the rearrangement device 25.

As shown in FIG. 5A, the rearrangement device 25 rearranges a matrix 34 (8 rows×8 columns), which includes the threshold table 28 (4 rows×4 columns) referred to at the time of execution of the gradation process and has the same number of pixels as the halftone image 32, in ascending order for each row (lateral direction in FIG. 5A). Then, as shown in FIG. 5B, the same rearrangement as the threshold table 28 shown in FIG. 5A is performed also for the halftone image 32. Here, a rearranged image 35 shown in FIG. 5B is the halftone image 32 after the rearrangement.

Next, an image processing procedure of the image processing apparatus 1A carried out as an example of an image processing method of the invention will be described.

Figure 6:
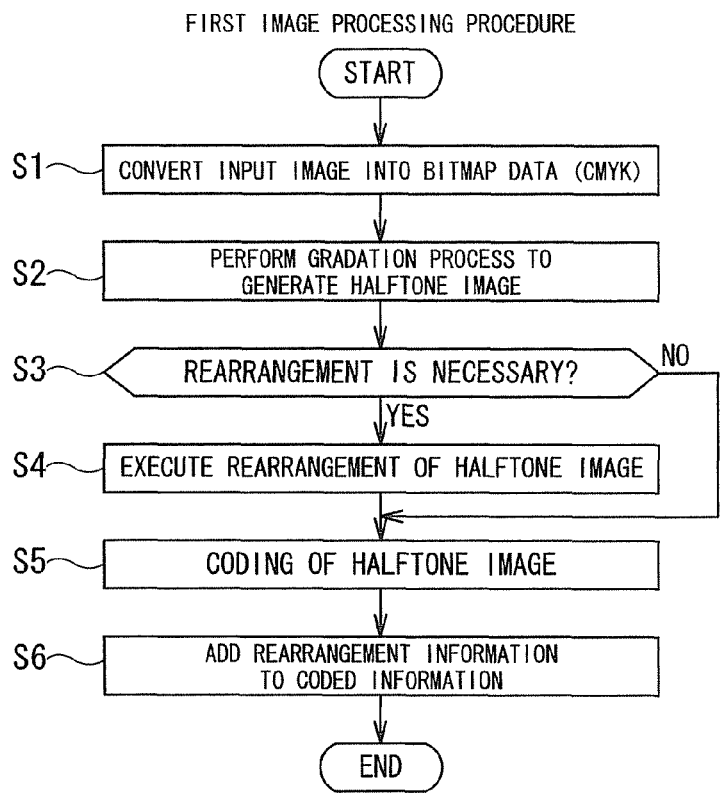
FIG. 6 is a process flow diagram for explaining an image processing procedure executed in the image processing apparatus of the first embodiment of the invention.

FIG. 6 is a process flow diagram for explaining the image processing procedure (hereinafter, referred to as a first image processing procedure) executed in the image processing apparatus 1A.

The first image processing procedure includes an image input step (step S1), a gradation processing step (step S2), a rearrangement necessity determination step (step S3), a rearrangement step (step S4) executed in the case (in case of YES at step S3) where it is determined at the rearrangement necessity determination step that the rearrangement is necessary, a coding processing step (step S5), and a rearrangement information addition step (step S6).

At step S1, the image input device 21 shown in FIG. 2 converts an inputted image (image data) into bitmap data expressed in the color coordinate system of C, M, Y and K.

Next, at step S2, the gradation processing device 22 shown in FIG. 2 receives the bitmap data generated at the image input step, performs the gradation process on the received bitmap data, and generates a halftone image.

Next, at step S3, the rearrangement determination device 23 determines the necessity of rearrangement of the halftone image generated at the gradation processing step. At this step, in the case where the rearrangement determination device 23 determines that the rearrangement of the halftone image is necessary (in case of YES at step S3), the processing procedure proceeds from step S3 to step S4.

Next, at step S4, the rearrangement device 25 executes the rearrangement of specified pixels of the halftone image generated at the rearrangement gradation processing step. Next, at step S5, coding of the halftone image is performed. In the case where the rearrangement step is executed, the halftone image as the object of the coding is the halftone image after the rearrangement.

Next, at step S6, the rearrangement information addition device 27 generates data by adding information indicating the presence or absence of execution of the rearrangement step and indicating which data table is the threshold table 28 referred to at the time of the rearrangement, as rearrangement information, to the coded data. When step S6 is completed, the first image processing procedure is ended.

In addition, at step S3, in the case where the rearrangement determination device 23 determines that the rearrangement of the halftone image is unnecessary (in case of NO at step S3), the processing procedure proceeds from step S3 to step S5, and the processing step subsequent to step S5 is executed. In this case, the object image to be coded at step S5 is the halftone image in which the rearrangement of pixels is not performed, that is, the halftone image generated at the gradation processing step.

According to the image processing apparatus 1A configured as described above and the first image processing procedure executed by the image processing apparatus 1A, high compression can be realized even for the image, such as the halftone image 32, in which it is difficult to realize high compression by a compression method using the approximation between adjacent pixels.

Besides, since the image processing apparatus 1A includes the rearrangement determination device 23, it is previously determined whether or not the image is such that the coding efficiency is lowered by performing the rearrangement (for example, the image is such that the effect of the halftone is small), and then, it is possible to determine whether or not the rearrangement process is to be executed. As a result, the coding efficiency of the image can be raised while the harmful effect due to the execution of the rearrangement process is avoided.

Incidentally, in this embodiment, although the description has been given to the case where the image processing apparatus 1A includes the rearrangement information addition device 27, the image processing apparatus 1A may not include the rearrangement information addition device 27.

The rearrangement information addition device 27 is a component necessary for decoding, and is unnecessary in the case where only the coding of data is desired to be performed in the image processing apparatus 1A. In this case, the coded data is transmitted from the coding device 26 to another equipment including the rearrangement information addition device 27 and the rearrangement information has only to be added. Besides, in the case where decoding is desired, when a decoding device not shown in FIG. 2 is in such a state that it refers to the coded data and the rearrangement information, and can specify and read the threshold table 28 used at the time of coding, the coded data can be decoded.

When a description will be made while using the image forming apparatus 2 shown in FIG. 1 as an example, for example, the controller 6 is made to have the function of the rearrangement information addition device 27, and when the device having the function of the rearrangement information addition device 27 is provided in the image forming apparatus 2, there is also a case where the image processing apparatus 1A does not include the rearrangement information addition device 27.

Further, in the rearrangement determination device 23, although the increase or decrease of the change points of the inputted image and the rearranged image is made the determination basis of the necessity of rearrangement, another determination basis can also be adopted. For example, such a determination basis that the rearrangement process is not performed in the case where an input image is a text may be adopted.

Second Embodiment

Figure 7:
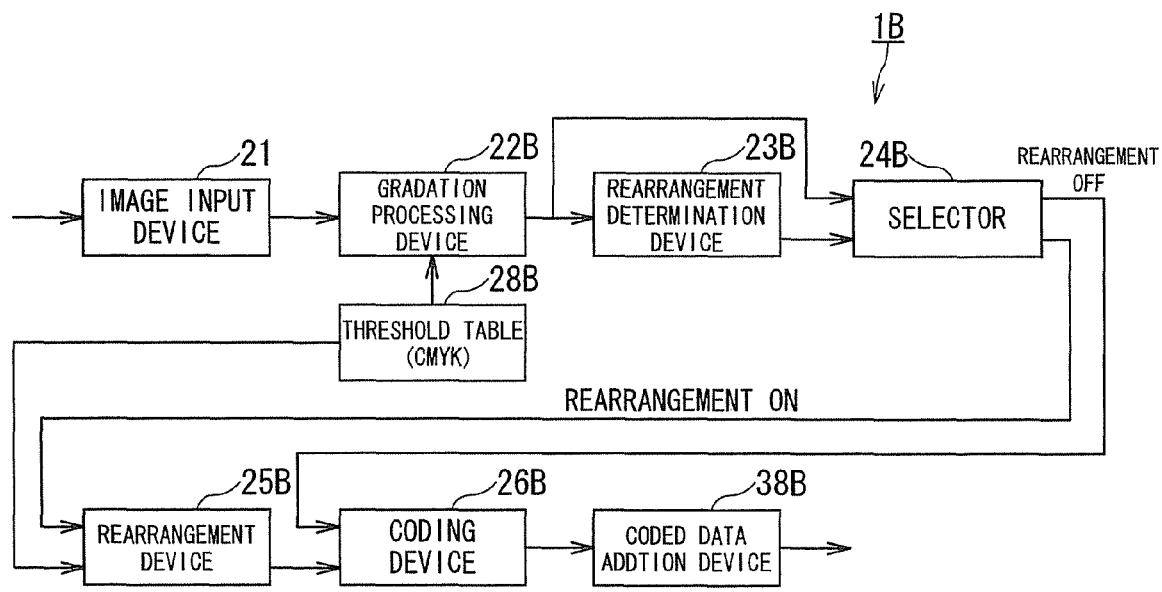
FIG. 7 is a view schematically illustrating a structure of an image processing apparatus of a second embodiment of the invention.

FIG. 7 is a schematic view schematically illustrating a structure of an image processing apparatus 1B as an example of an image processing apparatus of a second embodiment of the invention.

Although the image processing apparatus 1B is different from the image processing apparatus 1A in that it is structured so that a coding process for each color plane can be executed on an input image, other points are not substantially different. Then, components not substantially different from components of the image processing apparatus 1A are denoted by the same reference numerals and their explanation will be omitted.

According to FIG. 7, the image processing apparatus 1B includes an image input device 21, a gradation processing device 22B, a rearrangement determination device 23B, a selector 24B, a rearrangement device 25B, and a coded data addition device 38B. A threshold table 28B is a threshold table 28 prepared for each color plane of C (Cyan), M (Magenta), Y (Yellow) and K (Black), is stored in a data storage area such as, for example, the memory 5 shown in FIG. 1, and is stored in such a state that the gradation processing device 22B, the rearrangement determination device 23B and the rearrangement device 25B can refer to it.

The gradation processing device 22B, the rearrangement determination device 23B, the selector 24B and the rearrangement device 25B of the image processing apparatus 1B are respectively configured by providing, in parallel, the four gradation processing devices 22, the four rearrangement determination devices 23, the four selectors 24 and the four rearrangement devices 25 of the image processing apparatus 1A.

That is, the gradation processing device 22B performs the gradation process on the bitmap data for each color plane of C, M, Y and K converted by the image input device 21 and generates the halftone image for each color. At this time, reference is made to the threshold table 28B prepared for each color plane of C, M, Y and K.

The rearrangement determination device 23B determines the necessity of rearrangement of pixels based on the halftone image (image before the rearrangement) for each color plane of C, M, Y and K transmitted from the gradation processing device 22B and the rearranged image (image after the rearrangement is performed by referring to the threshold table 28B). The necessity of the rearrangement is determined based on whether or not the harmful effect such as the reduction in coding efficiency occurs by performing the rearrangement.

The selector 24B has a function to change the output destination of data of the inputted halftone image based on the rearrangement necessity (determination result) determined by the rearrangement determination device 23B for each color plane. In the case where the rearrangement determination device 23B determines that the rearrangement is necessary, the selector 24B selects the rearrangement device 25B as the data output destination, and in the case where the rearrangement determination device 23B determines that the rearrangement is unnecessary, the selector selects the coding device 26B as the data output destination, and outputs the data of the inputted halftone image for each color plane to the selected output destination.

The rearrangement device 25B has a function to rearrange pixels of the halftone image data of each color plane. The rearrangement device 25B refers to the threshold table 28B prepared for each color plane, uses the referred threshold table 28B, and rearranges the pixels of the halftone image for each color plane generated by the gradation processing device 22B (rearrangement process). The rearrangement device 25B transmits the data of the rearranged image generated by executing the rearrangement process to the coding device 26B.

The coding device 26B has a function to code data, and codes the data of the rearranged image for each color plane received from the rearrangement device 25B in the case where the rearrangement process is executed. Besides, in the case where the rearrangement process is not executed, the data of the halftone image for each color plane transmitted from the gradation processing device 22B is coded. The coded data generated for each color plane is transmitted to the coded data addition device 38B.

The coded data addition device 38B has a function to add, to the coded data coded for each color plane, information indicating a separation between the respective color planes and information (hereinafter, referred to as data adding information) indicating the presence or absence of rearrangement and which data table is the threshold table 28 referred to in the case where the rearrangement is executed. The coded data addition device 38B generates data (hereinafter, referred to as added data) in which the information indicating the separation between the respective color planes and the information indicating the presence or absence of the rearrangement and which data table is the threshold table 28 referred to in the case where the rearrangement process is executed are added to the coded data of each color plane. The added data is outputted to, for example, the storage device 10 as an example of an external apparatus and is stored.

Next, an image processing procedure of the image processing apparatus 1B carried out as an example of the image processing method of the invention will be described.

Figure 8:
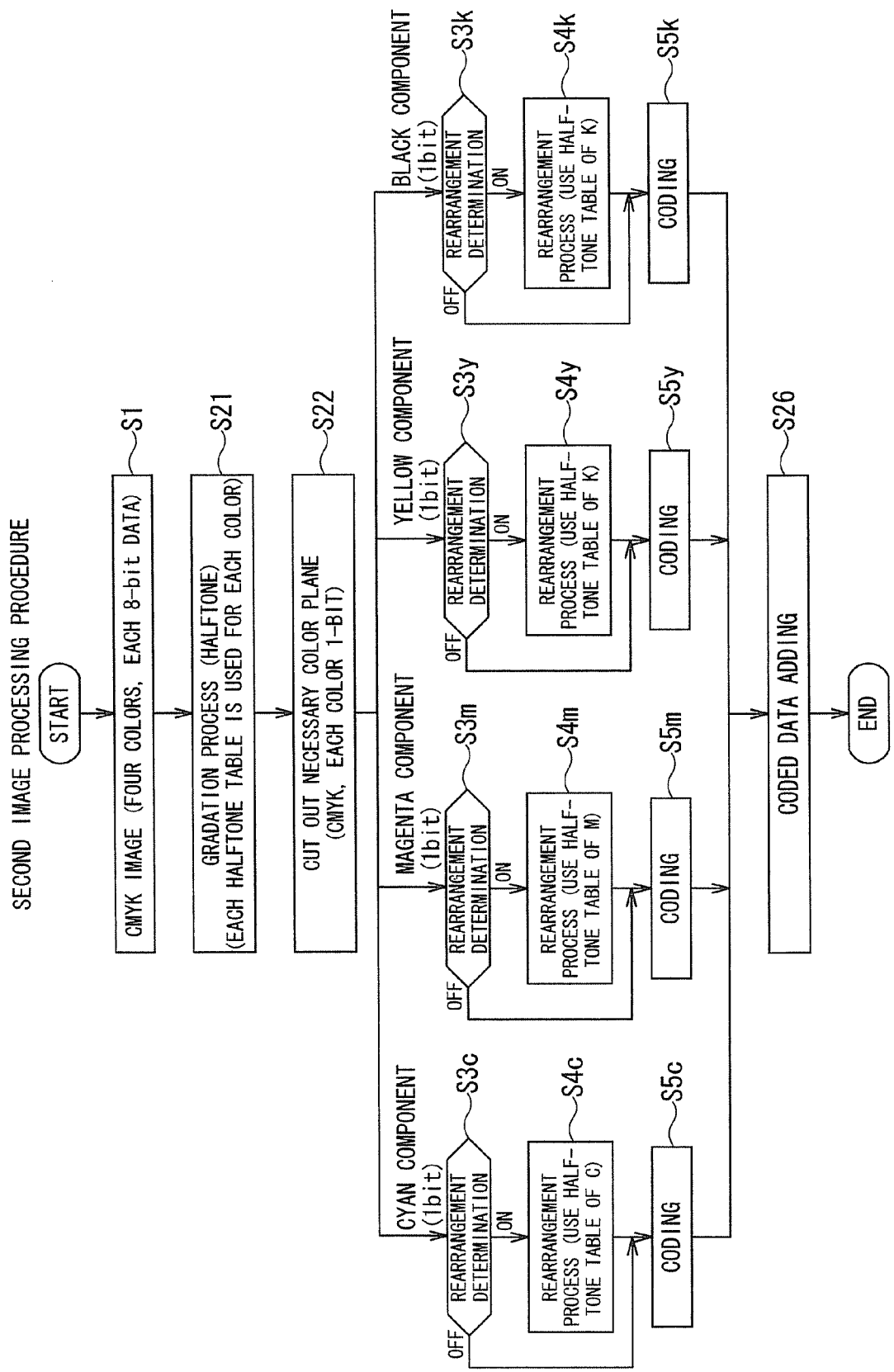
FIG. 8 is a process flow diagram for explaining an image processing procedure executed in the image processing apparatus of the second embodiment of the invention.

FIG. 8 is a process flow diagram for explaining the image processing procedure (hereinafter, referred to as a second image processing procedure) executed in the image processing apparatus 1B.

According to FIG. 8, the second image processing procedure includes an image input step (step S1), a gradation processing step (step S21), a color plane cutout step (step S22), rearrangement necessity determination steps (step S3c, step S3m, step S3y, step S3k), rearrangement steps (step S4c, step S4m, step S4y, step S4k) executed in the case where it is determined at the rearrangement necessity determination steps that the rearrangement is necessary (in case of YES at step S3c, step S3m, step S3y, step S3k), coding processing steps (step S5c, step S5m, step S5y, step S5k), and a coding data adding step (step S26).

When a description is made in brief, the second image processing procedure is the processing procedure in which the processing steps (step S2 to step S6) subsequent to step S2 of the first image processing procedure shown in FIG. 6 are independently performed for each color plane. Accordingly, the explanation of a substantially equal processing step will be omitted.

In the second image processing procedure, first, the image input step is executed at step S1, and next, the gradation processing step (step S21) and the color plane cutout step (step S22) are executed. At the gradation processing step (step S21) and the color plane cutout step (step S22), the gradation processing device 22B receives bitmap data (CMYK image) generated at the image input step, performs a gradation process for each color component (step S21), and cuts out each color plane of C, M, Y and K (step S22).

At the subsequent rearrangement necessity determination steps, the rearrangement steps and the coding processing steps, the processing steps of step S3 to step S5 shown in FIG. 1 are executed for each color plane of C, M, Y and K. Thereafter, at the coding data adding step (step S26), the coded data addition device 38B adds the data adding information to the coded data coded for each color plane. When step S26 is completed, the second image processing procedure is ended.

According to the image processing apparatus 1B configured as described above and the second image processing procedure executed by the image processing apparatus 1B, in addition to the effects obtained by the image processing apparatus 1A and the first image processing procedure, since the process is performed for each color plane, the feature of each color plane can be brought out more effectively than the image processing apparatus 1A and the first image processing procedure.

For example, with respect to an image in which the background is yellow (rearrangement determination is ON) and a black character (rearrangement determination is OFF) exists, this embodiment is more effective than the image processing apparatus 1A and the first image processing procedure in which the necessity of rearrangement is indiscriminately determined.

Incidentally, in this embodiment, although the description has been given to the case where the image processing apparatus 1B includes the coded data addition device 38B, the image processing apparatus 1B may not include the coded data addition device 38B.

The coded data addition device 38B is a component necessary for decoding, and is not necessary in the case where only the coding of data is desired to be performed in the image processing apparatus 1B. In this case, coded data is transmitted from the coding device 26B to another equipment including the coded data addition device 38B and the data adding information has only to be added. Besides, in the case where decoding is desired, when a decoding device not shown in FIG. 2 is in such a state that it refers to the coded data and the data adding information, and can specify and read the threshold table 28 used at the time of coding, the coded data can be decoded.

Third Embodiment

Figure 9:
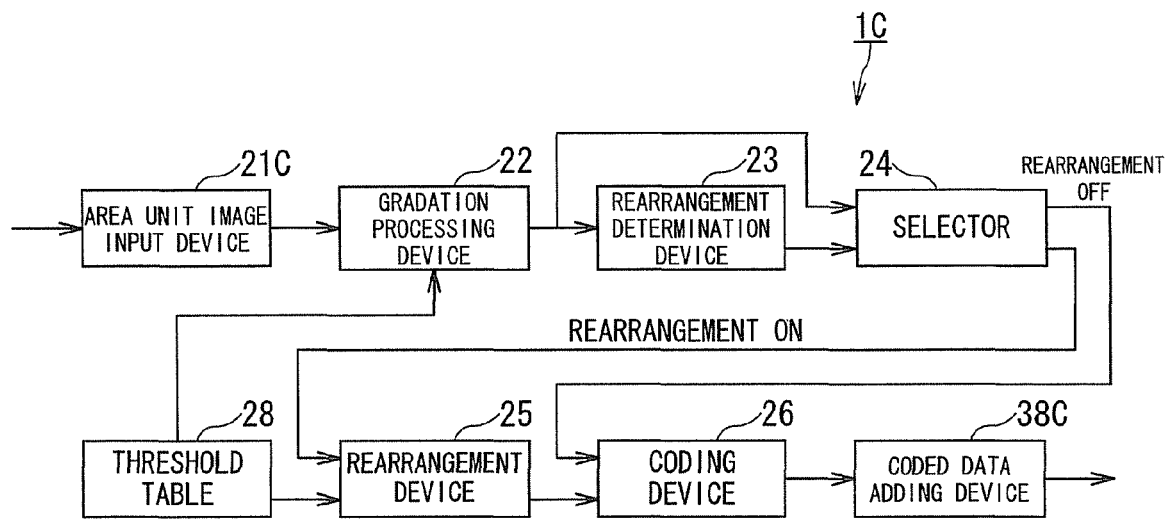
FIG. 9 is a view schematically illustrating a structure of an image processing apparatus of a third embodiment of the invention.

FIG. 9 is a schematic view schematically illustrating a structure of an image processing apparatus 1C as an example of an image processing apparatus of a third embodiment of the invention.

The image processing apparatus 1C is different from the image processing apparatus 1A shown in FIG. 2 in that an area unit image input device 21C is provided instead of the image input device 21, and a coded data addition device 38C is provided instead of the rearrangement information addition device 27, however, other points are substantially not different. Then, components substantially not different from components of the image processing apparatus 1A are denoted by the same reference numerals and their explanation will be omitted.

The image processing apparatus 1C includes the area unit image input device 21C to generate bitmap data (uncompressed data) of CMYK in units of a specified area including plural pixels from image data, a gradation processing device 22, a rearrangement determination device 23, a selector 24, a rearrangement device 25, a coding device 26, and the coded data addition device 38C to generate data in which rearrangement information and information of a separation between area units are added to the coded data.

The image input device 21C has a function to convert an image (image data) into bitmap data (uncompressed data) of CMYK in units of the specified area including the plural pixels, not in a pixel unit, and a function to convert a color coordinate system of the image into four color planes of C, M, Y and K.

The image input device 21C converts the input image (image data) into the bitmap data in the unit of the specified area (for example, the area including plural pixels 30 such as all pixels 30 of one row (lateral one line) shown in FIG. 3) and converts the color coordinate system into CMYK. Then, the bitmap data after conversion is transmitted to the gradation processing device 22.

The gradation processing device 22, the rearrangement determination device 23, the selector 24, the rearrangement device 25 and the coding device 26 are as described in the first embodiment. When receiving the coded data transmitted from the coding device 26, the coded data addition device 38C generates data (hereinafter, referred to as area unit rearrangement data) in which rearrangement information and area unit separation information (hereinafter, referred to as area unit rearrangement information) indicating the separation between the area units are added to the received coded data. The coded data addition device 38C outputs the generated area unit rearrangement data to, for example, the storage device 10 as an example of an external apparatus and stores it. The area unit rearrangement data is used when the coded data is decoded.

Next, an image processing procedure of the image processing apparatus 1C carried out as an example of the image processing method of the invention will be described in brief.

The image processing procedure executed in the image processing apparatus 1C is different in that step S1 of the first image processing procedure is not executed by the image processing apparatus 21, but is executed by the area unit image input device 21C. Besides, there is a difference in that step S6 is not executed by the rearrangement information addition device 27, but is executed by the coded data addition device 38C.

That is, there is a difference in that at step S1 shown in FIG. 6, the input image is not converted into the bitmap data in pixel units, but is converted into the bitmap data in units of the specified area, and there is a difference in that at step S6, the area unit rearrangement information is generated instead of the rearrangement information, however, other processing steps are not substantially different.

According to the image processing apparatus 1C configured as described above and the image processing procedure executed by the image processing apparatus 1C, in addition to the effects obtained by the image processing apparatus 1A and the first image processing procedure, since the process is performed for each specified area including the plural pixels, as compared with the image processing apparatus 1A and the first image processing procedure, coding can be effectively performed also for such an image that the structure of the image varies according to an area even if the image is on one sheet (for example, the case where the upper part of the image is a character, and the lower part thereof is a photograph).

Incidentally, similarly to the case of the rearrangement information addition device 27 of the image processing apparatus 1A, the image processing apparatus 1C may not include the coded data addition device 38C. In this case, the coded data is transmitted from the coding device 26 to another equipment including the coded data addition device 38C and the area unit rearrangement information has only to be added. Besides, in the case where decoding is desired, when a decoding device not shown in FIG. 2 is in such a state that it refers to the coded data and the coded data addition device 38C, and can specify and read the threshold table 28 used at the time of coding, the coded data can be decoded.

Fourth Embodiment

Figure 10:
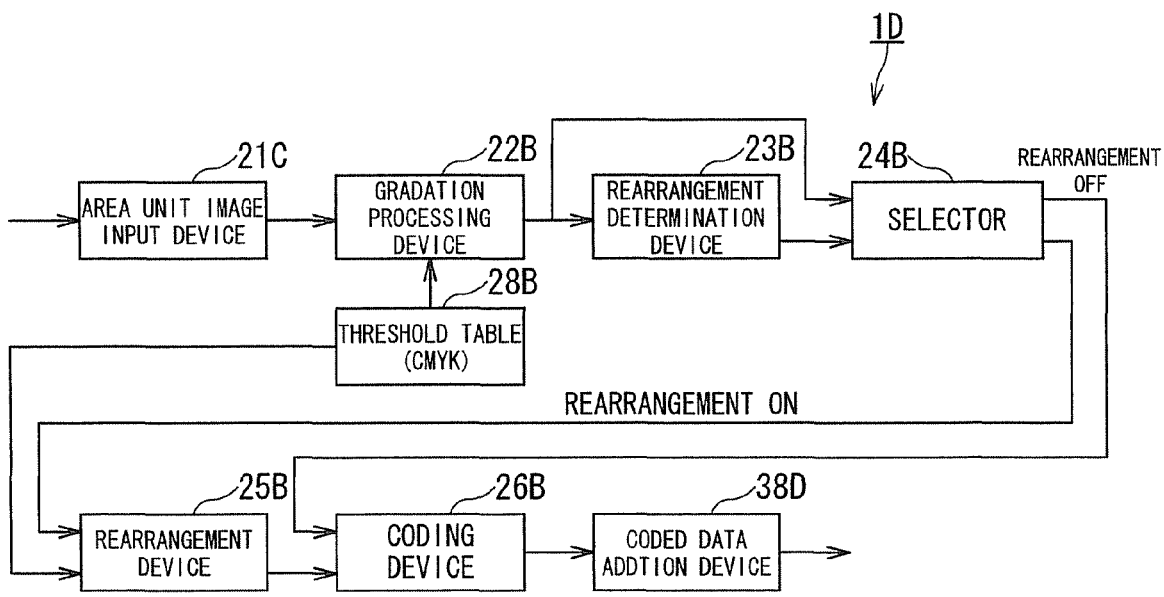
FIG. 10 is a view schematically illustrating a structure of an image processing apparatus of a fourth embodiment of the invention.

FIG. 10 is a schematic view schematically illustrating a structure of an image processing apparatus 1D as an example of an image processing apparatus of a fourth embodiment of the invention.

The image processing apparatus 1D is different from the image processing apparatus 1B shown in FIG. 7 in that an area unit image input device 21C is provided instead of the image input device 21, and a coded data addition device 38D is provided instead of the coded data addition device 38B, however, other points are not substantially different. Then, components not substantially different from components of the image processing apparatus 1B are denoted by the same reference numerals and their explanation will be omitted.

As shown in FIG. 10, the image processing apparatus 1D includes the area unit image input device 21C, a gradation processing device 22B, a rearrangement determination device 23B, a selector 24B, a rearrangement device 25B, and the coded data addition device 38D. In other words, the image processing apparatus 1D is the apparatus in which the concept of the image processing apparatus 1C is applied to the image processing apparatus 1B.

The coded data addition device 38D is the device having a function of both the coded data addition device 38B and the coded data addition device 38C. That is, the coded data addition device 38D has the function to add data adding information and information (hereinafter, referred to as area unit data adding information) indicating information of a separation between area units to the coded data coded for each color plane, and generates data (hereinafter, referred to as area unit added data) in which the area unit data adding information is added to the coded data of each color plane. The area unit added data is outputted to, for example, the storage device 10 as an example of an external apparatus and is stored.

Next, an image processing procedure of the image processing apparatus 1D carried out as an example of the image processing method of the invention will be described in brief. The image processing procedure of the image processing apparatus 1D is different from the second image processing procedure shown in FIG. 8 in that step S21 is not executed by the image processing apparatus 21, but is executed by the area unit image input device 21C. Besides, there is a difference in that step S26 is not executed by the coded data addition device 38B, but is executed by the coded data addition device 38D.

That is, at step S21 shown in FIG. 8, there is a difference in that the input image is not converted into the bitmap data in the pixel unit, but is converted into the bitmap data in the specified area unit, and at step S26, there is a difference in that instead of the data adding information, the area unit data adding information is generated, however, other processing steps are not substantially different.

According to the image processing apparatus 1D configured as described above and the image processing procedure executed by the image processing apparatus 1D, in addition to the effects obtained by the image processing apparatus 1B and the second image processing procedure, since the process is performed for each specified area including the plural pixels, as compared with the image processing apparatus 1B and the second image processing procedure, coding can be effectively performed also for such an image that the structure of the image varies according to an area even if the image is on one sheet (for example, the case where the upper part of the image is a character, and the lower part thereof is a photograph).

Incidentally, similarly to the case of the coded data addition device 38B of the image processing apparatus 1B, the image processing apparatus 1D may not include the coded data addition device 38D. In this case, the coded data is transmitted from the coding device 26 to another equipment including the coded data addition device 38D and the area unit information has only to be added. Besides, in the case where decoding is desired, when a decoding device not shown in FIG. 2 is in such a state that it refers to the coded data and the coded data addition device 38C, and can specify and read the threshold table 28C used at the time of coding, the decoding of the coded data is possible.

Fifth Embodiment

Figure 11:
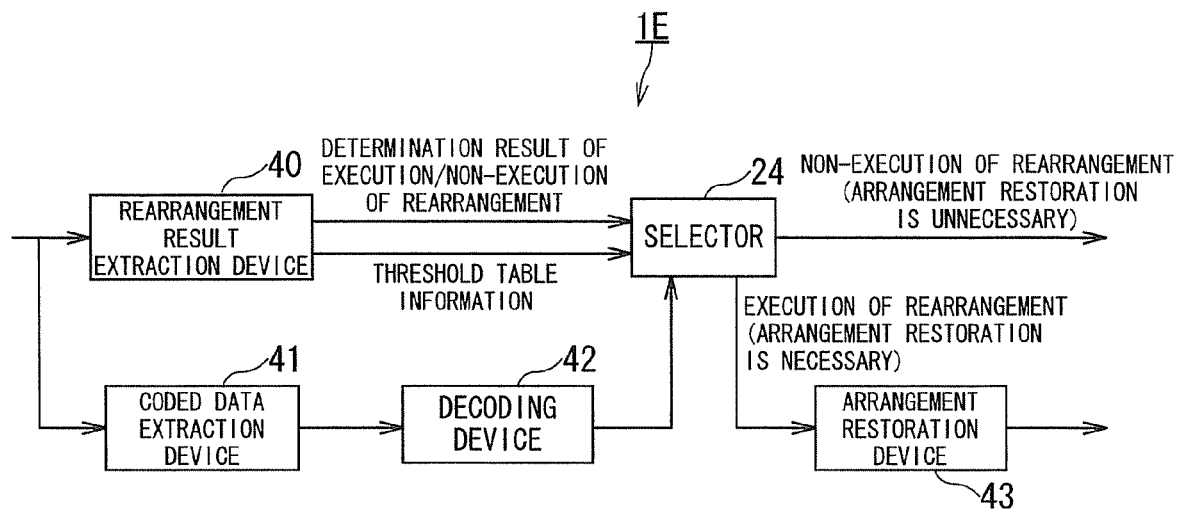
FIG. 11 is a view schematically illustrating a structure of an image processing apparatus of a fifth embodiment of the invention.

FIG. 11 is a schematic view schematically illustrating a structure of an image processing apparatus 1E as an example of an image processing apparatus of a fifth embodiment of the invention.

The image processing apparatus 1E is the apparatus having a function as an image data decompression device and corresponding to the image processing apparatus 1A functioning as a kind of image data compression apparatus. Specifically, the image processing apparatus 1E includes a rearrangement result extraction device 40, a coded data extraction device 41, a decoding device 42, a selector 24 and an arrangement restoration device 43.

The rearrangement result extraction device 40 has such a function that when the output data of the image processing apparatus 1A specified by the user, that is, the coded data to which the rearrangement information is added is received through, for example, the interface device 3 (input device 8) shown in FIG. 1, the rearrangement information is extracted from the received data.

Here, the data (output data of the image processing apparatus 1A) inputted to the image processing apparatus BE is such data that the controller 6 (shown in FIG. 1) of the image processing apparatus 2 not shown in FIG. 11 retrieves and reads the output data of the image processing apparatus 1A specified by the user, and the controller 6 transmits the retrieved and read data to the rearrangement result extraction device 40 and the coded data extraction device 41.

The rearrangement result extraction device 40 extracts the rearrangement information from the coded data to which the rearrangement information is added, determines, based on the extracted rearrangement information, whether the rearrangement device 25 has performed the rearrangement of pixels 30 of an input image 31, and transmits the information of the determination result to the selector 24.

Further, when determining that the rearrangement of the pixels 30 of the input image 31 has been performed, the rearrangement result extraction device 40 extracts information (hereinafter, referred to as threshold table information) indicating which data table is the threshold table 28 referred to at the time of the rearrangement, and transmits it to the selector 24 (threshold table information extraction step).

The coded data extraction device 41 has a function to extract coded data from data, and uses the function to extract the coded data indicating the halftone image after the rearrangement from the received data. The extracted coded data is transmitted to the decoding device 42.

The decoding device 42 has a function to decode the coded data. The decoding device 42 uses the function, and decodes the coded data received from the coded data extraction device 41. The decoding device 42 decodes the coded data and transmits the data which has been decoded (hereinafter, referred to as the decoded data) to the selector 24. Here, the decoded data is the data before the coding, that is, the image data indicating the halftone image.

Among the information received from the rearrangement result extraction device 40, based on the information of the determination result indicating whether the rearrangement has been performed, the selector 24 determines whether the decoded data received from the decoding device 42 has been subjected to the rearrangement, and changes the output destination of the received decoded data. In the case where the rearrangement has not been performed, the selector 24 outputs the decoded data to the outside of the image processing apparatus 1E, and in the case where the rearrangement has been performed, the selector 24 transmits the received threshold table information, together with the decoded data, to the arrangement restoration device 43.

Based on the received threshold table information, the arrangement restoration device 43 specifies the threshold table 28B used at the time of the rearrangement, and uses the specified threshold table 28B to rearrange (restore) the pixels 30 into the state before the rearrangement. The arrangement restoration device 43 outputs the decoded data after the restoration to the outside of the image processing apparatus 1E.

Next, an image processing procedure (hereinafter, referred to as a third image processing procedure) of the image processing apparatus 1E carried out as an example of the image processing method of the invention will be described.

Figure 12:
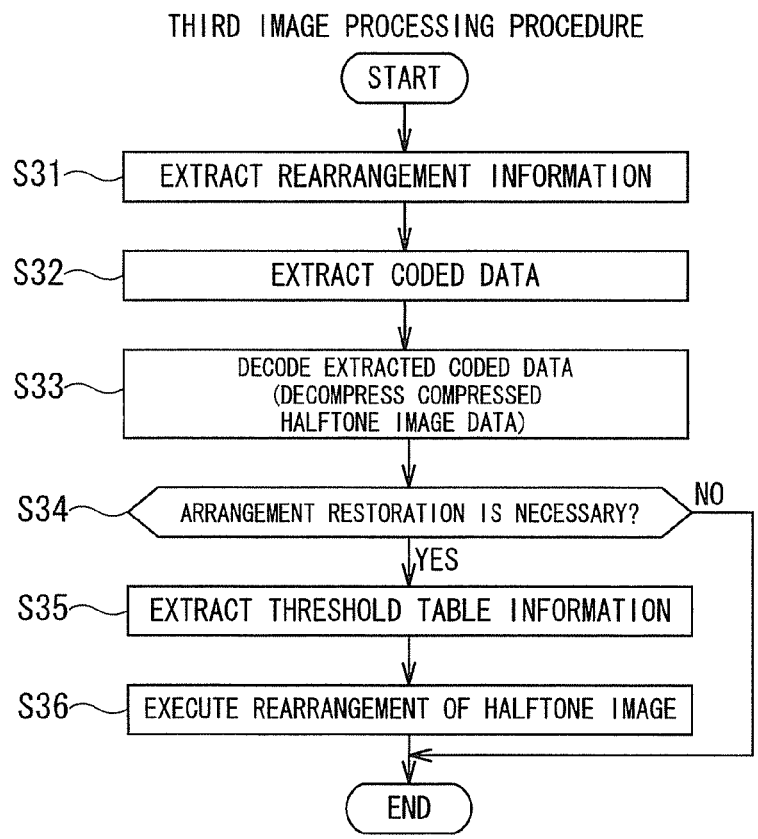
FIG. 12 is a process flow diagram for explaining an image processing procedure executed in the image processing apparatus of the fifth embodiment of the invention.

FIG. 12 is a process flow diagram for explaining the third image processing procedure executed in the image processing apparatus 1E.

According to FIG. 12, the third image processing procedure includes a rearrangement information extraction step (step S31), a coded data extraction step (step S32), a decoding step (step S33), an arrangement restoration necessity determination step (step S34), and an arrangement restoration step (step S35, step S36) executed in the case where it is determined that the arrangement restoration is necessary (in case of YES at step S34). That is, the third image processing procedure includes plural processing steps to decode the coded data generated in the first image processing procedure shown in FIG. 6.

In the third image processing procedure, when the coded data to which the rearrangement information is added is specified as the image processing object, the processing procedure is started, and first, at step S31, the rearrangement result extraction device 40 extracts the rearrangement information from the received data (coded data to which the rearrangement information is added), and determines, based on the extracted rearrangement information, whether the rearrangement device 25 has performed the rearrangement of the pixels 30 of the input image 31.

Next, at step S32, the coded data extraction device 41 extracts the coded data indicating the halftone image after the rearrangement from the received data (coded data to which the rearrangement information is added). Next, at step S33, the decoding device 42 decodes the coded data extracted at step S32.

Next, at step S34, based on the information of the determination result indicating whether the rearrangement has been performed, the selector 24 determines whether the decoded data has been subjected to the rearrangement, that is, the necessity of arrangement restoration. Then, in the case where it is determined that the arrangement restoration is necessary (in case of YES at step S34), the third image processing procedure proceeds to step S35, and at step S35, the arrangement restoration device 43 extracts the threshold table 28B used at the time of the rearrangement. Then, at next step S36, the rearranged pixels 30 are restored into the state before the rearrangement by using the extracted threshold table 28B. When step S36 is completed, the third image processing procedure is ended.

On the other hand, in the case where the selector 24 determines that the arrangement restoration is unnecessary (in case of NO at step S34), the third image processing procedure is ended.

Incidentally, in the third image processing procedure, the processing steps of step S31 and step S32 may be performed in parallel, or the order of the processing execution may be reversed.

According to the image processing apparatus 1E configured as state above and the third image processing procedure executed by the image processing apparatus 1E, the image compressed by the image processing apparatus 1A and the first image processing procedure can be decoded.

Sixth Embodiment

Figure 13:
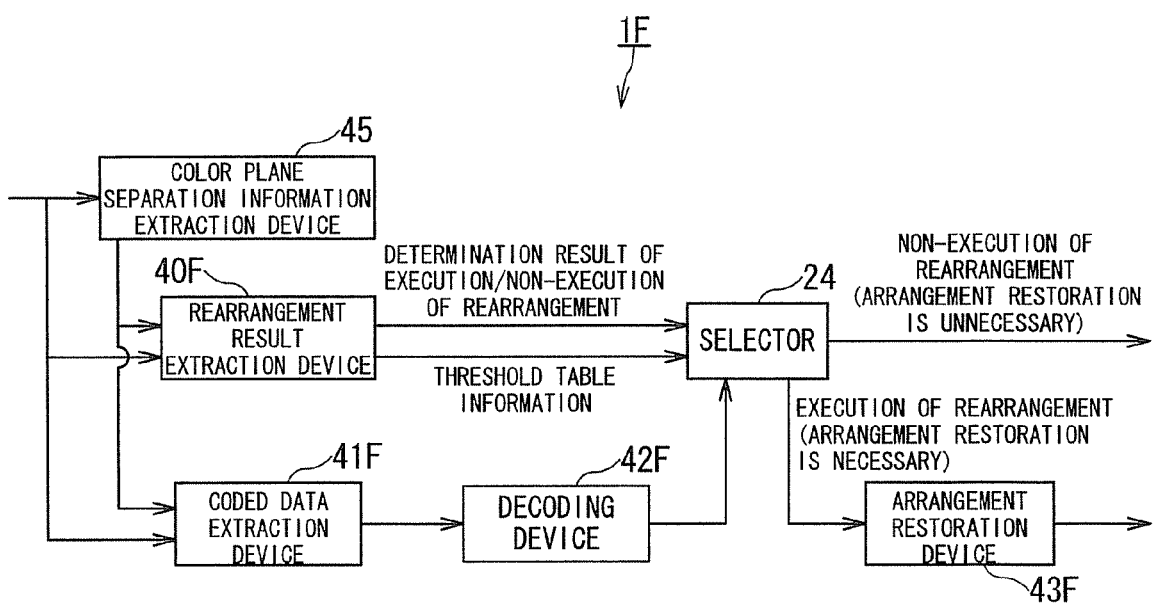
FIG. 13 is a view schematically illustrating a structure of an image processing apparatus of a sixth embodiment of the invention.

FIG. 13 is a schematic view schematically illustrating a structure of an image processing apparatus 1F as an example of an image processing apparatus of a sixth embodiment of the invention.

The image processing apparatus 1F is the apparatus having a function as an image data decompression device and corresponding to the image processing apparatus 1B functioning as a kind of image data compression apparatus.

Specifically, the image processing apparatus 1F is different from the image processing apparatus 1E in that a color plane separation information extraction device 45 is further provided, and instead of the rearrangement result extraction device 40, the coded data extraction device 41, the decoding device 42 and the arrangement restoration device 43, a rearrangement result extraction device 40F, a coded data extraction device 41F, a decoding device 42F and a restoration device 43F are provided for executing each process for each color plane of CMYK, however, other points are not substantially different.

Then, in the following description of the image processing apparatus 1F, components not substantially different from those of the image processing apparatus 1E are denoted by the same reference numerals and their explanation will be omitted.

The image processing apparatus 1F includes the color plane separation information extraction device 45, the rearrangement result extraction device 40F, the coded data extraction device 41F, the decoding device 42F and the arrangement restoration device 43F.

The color plane separation information extraction device 45 has such a function that when the output data of the image processing apparatus 1B specified by the user, that is, the coded data to which the data adding information is added is received through, for example, the interface device 3 (input device 8) shown in FIG. 1, the information indicating the color plane separation is extracted from the received data.

Here, the data (output data of the image processing apparatus 1B) inputted to the image processing apparatus 1F is such data that the controller 6 (shown in FIG. 1) of the image forming apparatus 2 not shown in FIG. 13 retrieves and reads the output data of the image processing apparatus 1B specified by the user, and the controller 6 transmits the retrieved and read data to the color plane separation information extraction device 45, the rearrangement result extraction device 40F and the coded data extraction device 41F.

The color plane separation information extraction device 45 extracts the information indicating the color plane separation included in the data adding information from the coded data to which the data adding information is added, and transmits the extracted information to the rearrangement result extraction device 40F and the coded data extraction device 41F.

The rearrangement result extraction device 40F extracts the rearrangement information for each color plane of CMYK from the coded data to which the data adding information is added, determines, based on the extracted rearrangement information, whether the rearrangement device 25B has performed the rearrangement of the pixels 30 of the input image 31, and transmits the information of the determination result to the selector 24. Besides, the rearrangement result extraction device 40F transmits the threshold table information indicating which data table is the threshold table 28B referred to at the time of the rearrangement to the selector 24.

The coded data extraction device 41F has a function to extract coded data for each color plane of CMYK from data, and uses the function to extract the coded data for each color plane from the received data. Then, the extracted coded data is transmitted to the decoding device 42F.

The decoding device 42F has a function to decode coded data for each color plane of CMYK. The decoding device 42F uses the function to decode the coded data for each color plane of CMYK received from the coded data extraction device 41. When decoding the coded data for each color plane of CMYK, the decoding device 42F transmits the decoded data to the selector 24.

Based on the information of the determination result received from the rearrangement result extraction device 40F and indicating whether the rearrangement has been performed, the selector 24 of the image processing apparatus 1F determines whether the decoded data received from the decoding device 42F has been subjected to the rearrangement, and changes the output destination of the received decoded data. In the case where the rearrangement is not performed, the selector 24 outputs the decoded data to the outside of the image processing apparatus 1F, and in the case where the rearrangement is performed, the selector transmits the received threshold table information, together with the decoded data, to the arrangement restoration device 43F.

The arrangement restoration device 43F specifies, based on the received threshold table information, the threshold table 28B used at the time of the rearrangement, and uses the specified threshold table 28B to again arrange the rearranged pixels 30 into the state before the rearrangement. The arrangement restoration device 43F outputs the decoded data after the restoration to the outside of the image processing apparatus 1F.

Next, an image processing procedure (hereinafter, referred to as a fourth image processing procedure) of the image processing apparatus 1F carried out as an example of the image processing method of the invention will be described.

Figure 14:
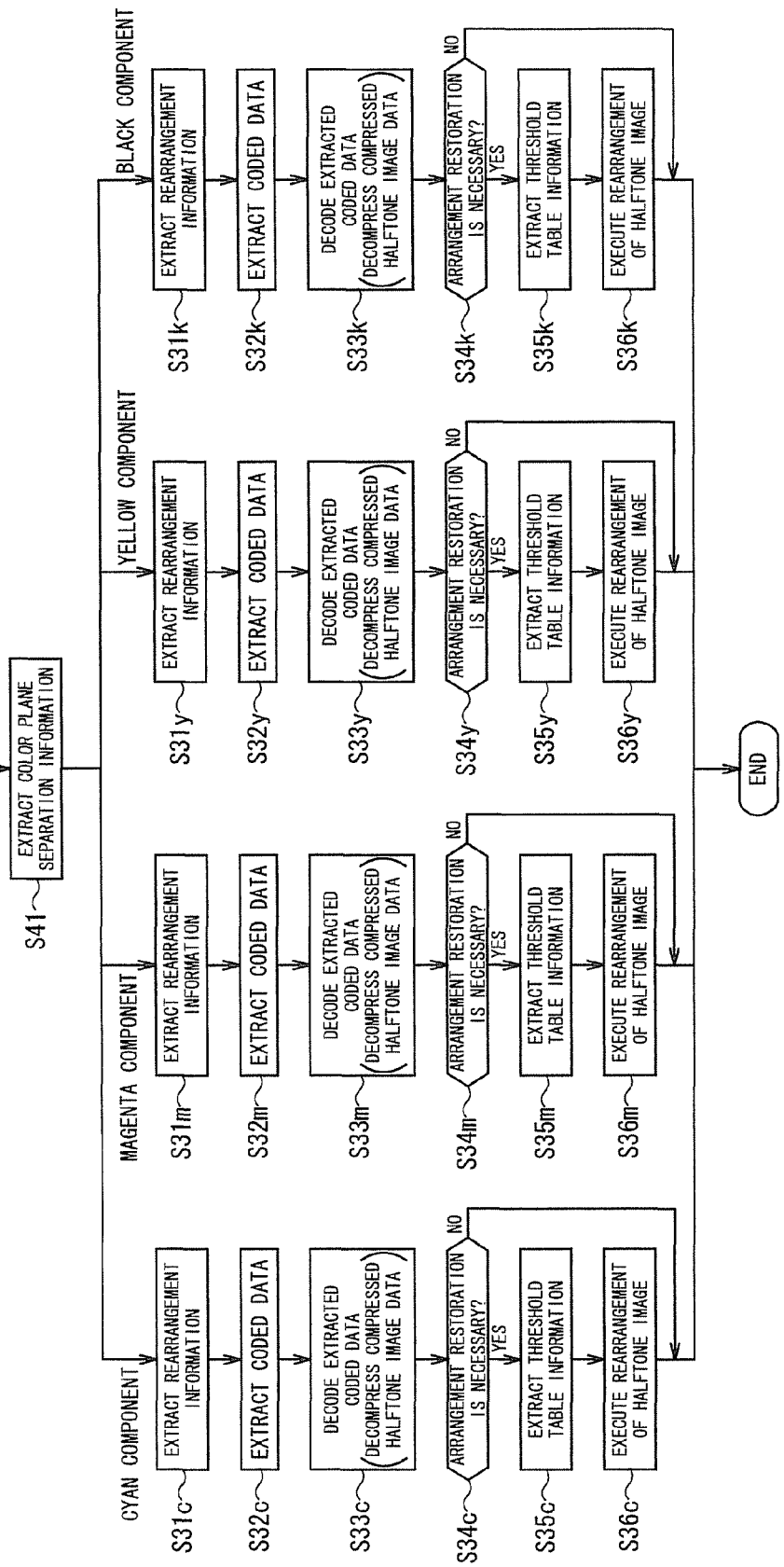
FIG. 14 is a process flow diagram for explaining an image processing procedure executed in the image processing apparatus of the sixth embodiment of the invention.

FIG. 14 is a process flow diagram for explaining the fourth image processing procedure executed in the image processing apparatus 1F.

According to FIG. 14, the fourth image processing procedure includes plural processing steps to decode the coded data generated by the second image processing procedure shown in FIG. 8, and is different from the third image processing procedure in that a color plane separation information extraction step (step S41) is further provided, and the processing steps of step S31 to step S36 are executed for each color plane of CMYK, however, other points are not substantially different.

That is, the fourth image processing procedure includes the color plane separation information extraction step (step S41), rearrangement information extraction steps (steps S31C, S31M, S31Y and S31K) executed for each color plane of CMYK, coded data extraction steps (steps S32C, S32M, S32Y and S32K), decoding steps (steps S33C, S33M, S33Y and S33K), arrangement restoration necessity determination steps (steps S34C, S34M, S34Y and S34K), and arrangement restoration steps (steps S35C and S36C, S35M and 36M, S35Y and S36Y, and S35K and S36K) executed in the case where it is determined that the arrangement restoration is necessary (in case of YES at step S34C, step S34M, step S34Y, step S34K).

In the fourth image processing procedure, when coded data to which data adding information is added is specified as an image processing object, the processing procedure is started, and first, at step S41, the color plane separation information extraction device 45 extracts the information indicating the color plane separation included in the data adding information from the coded data to which the data adding information is added.

Next, at step S31 (steps S31C, S31M, S31Y and S31K) the rearrangement result extraction device 40F extracts rearrangement information for each color plane of CMYK from the received data adding information (coded data including the rearrangement information), and determines, based on the extracted rearrangement information, whether the rearrangement device 25B has performed the rearrangement of pixels 30 of an input image 31.

Next, at step S32 (steps S32C, S32M, S32Y and S32K) the coded data extraction device 41F extracts the coded data for each color plane of CMYK indicating a halftone image after the rearrangement from the received data adding information. Next, at step S33 (steps S33C, S33M, S33Y and S33K), the decoding device 42F decodes the coded data for each color plane of CMYK extracted at step S32.

Next, at step S34 (steps S34C, S34M, S34Y, and S34K) based on the information of the determination result indicating whether the rearrangement is performed for each color plane of CMYK, the selector 24 determines whether the decoded data has been subjected to the rearrangement, that is, the necessity of the arrangement restoration. Then, in the case where it is determined that the arrangement restoration is necessary (in case of YES at step S34C, step S34M, step S34Y, step S34K), at next step S35 (steps S35C, S35M, S35Y, and S35K), the arrangement restoration device 43F extracts the threshold table 28B used at the time of rearrangement. Then, at next step S36 (step S36C, S36M, S36Y, and S36K), the extracted threshold table 28B is used to restore the rearranged pixels 30 into a state before the rearrangement for each color plane of CMYK. When step S36 is completed, the fourth image processing procedure is ended.

On the other hand, in the case where the selector 24 determines that the arrangement restoration is unnecessary (in case of NO at step S34C, step S34M, step S34Y, step S34K), the fourth image processing procedure is ended.

Incidentally, in the fourth image processing procedure, similarly to the third image processing procedure, the processing steps of step S31 and step S32 may be performed in parallel, or the order of the processing execution may be reversed.

According to the image processing apparatus 1F configured as state above and the fourth image processing procedure executed by the image processing apparatus 1F, the image compressed by the image processing apparatus 1B and the second image processing procedure can be decoded.

Seventh Embodiment

Figure 15:
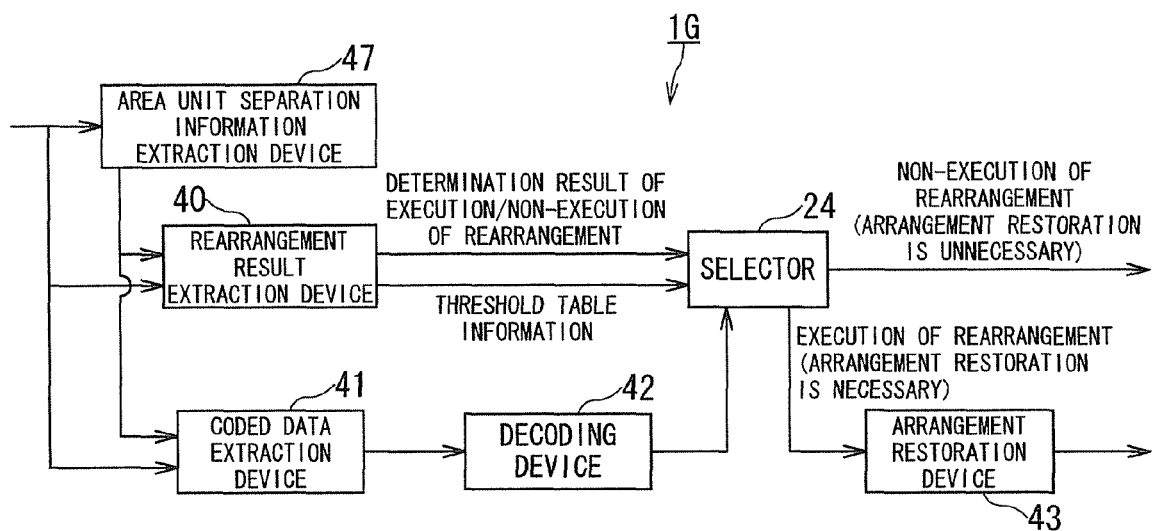
FIG. 15 is a view schematically illustrating a structure of an image processing apparatus of a seventh embodiment of the invention.

FIG. 15 is a schematic view schematically illustrating a structure of an image processing apparatus 1G as an example of an image processing apparatus of a seventh embodiment of the invention.

The image processing apparatus 1G is the apparatus having a function as an image data decompression device and corresponding to the image processing apparatus 1C functioning as a kind of image data compression device. Specifically, the image processing apparatus 1G is different from the image processing apparatus 1E in that an area unit separation information extraction device 47 is further provided, and a rearrangement result extraction device 40, a coded data extraction device 41, a decoding device 42 and an arrangement restoration device 43 execute the respective processes in units of an area, however, other points are not substantially different. Then, components not substantially different from those of the image processing apparatus 1E are denoted by the same reference numerals and their explanation will be omitted.

The image processing apparatus 1G includes the area unit separation information extraction device 47, the rearrangement result extraction device 40, the coded data extraction device 41, the decoding device 42 and the arrangement restoration device 43.

The area unit separation information extraction device 47 has such a function that when the output data of the image processing apparatus 1C specified by the user, that is, the area unit rearrangement data as the coded data to which the area unit rearrangement information is added is received through, for example, the interface device 3 (input device 8) shown in FIG. 1, area unit separation information indicating a separation between the area units is extracted from the received data. When receiving the area unit rearrangement data, the area unit separation information extraction device 47 uses the function to extract the area unit separation information from the received data (area unit separation information extraction step).

Here, the data (output data of the image processing apparatus 1C) inputted to the image processing apparatus 1G is such data that the controller 6 (shown in FIG. 1) of the image processing apparatus 2 not shown in FIG. 13 retrieves and reads the output data of the image processing apparatus 1C specified by the user, and the controller 6 transmits the retrieved and read data to the area unit separation information extraction device 47, the rearrangement result extraction device 40 and the coded data extraction device 41.

With respect to the rearrangement result extraction device 40, the coded data extraction device 41, the decoding device 42 and the arrangement restoration device 43 of the image processing apparatus 1G, the respective processes performed by the rearrangement result extraction device 40, the coded data extraction device 41, the decoding device 42 and the rearrangement restoration device 43 of the image processing apparatus 1E are executed in units of an area including plural pixels, not in units of pixels.

Next, an image processing procedure of the image processing apparatus 1G executed as an example of the image processing method of the invention will be described in brief.

Figure 16:
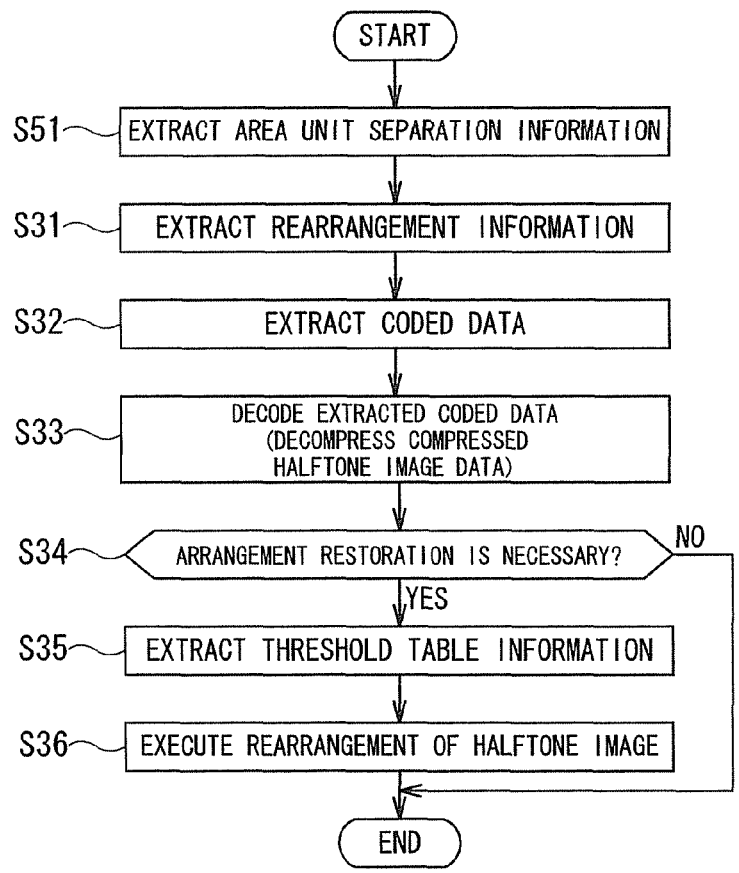
FIG. 16 is a process flow diagram for explaining an image processing procedure executed in the image processing apparatus of the seventh embodiment of the invention.

FIG. 16 is a process flow diagram for explaining an image processing procedure executed in the image processing apparatus 1G.

As shown in FIG. 16, the image processing procedure of the image processing apparatus 1G includes plural processing steps of decoding the coded data generated in the image processing procedure performed by the image processing apparatus 1C, and is different from the third image processing procedure in that an area unit separation information extraction step is further provided, and processing steps of step S31 to step S36 are performed in units of an area, however, other points are not substantially different.

That is, the image processing procedure of the image processing apparatus 1G includes an area unit separation information extraction step, a rearrangement information extraction step (step S31) shown in FIG. 12, a coded data extraction step (step S32), a decoding step (step S33), an arrangement restoration necessity determination step (step S34), and an arrangement restoration step (step S35) executed in the case where it is determined that the arrangement restoration is necessary (in case of YES at step S34).

In the image processing procedure of the image processing apparatus 1G, first, the area unit separation information extraction step is executed, and the area unit separation information extraction device 47 extracts the area unit separation information from the received area unit rearrangement data. Thereafter, similarly to the third image processing procedure, in the area unit based on the extracted area unit separation information, the rearrangement information extraction step (step S31), the coded data extraction step (step S32), the decoding step (step S33), the arrangement restoration necessity determination step (step S34), and the restoration step (step S35, step S36) in the case (in case of YES at step S34) where it is determined that the arrangement restoration is necessary are executed.

Incidentally, with respect to the area unit separation information extraction step, as long as it is executed before the decoding step, it may be executed after the rearrangement information extraction step (step S31) and the coded data extraction step (step S32) or they may be processed in parallel.

According to the image processing apparatus 1G configured as described above and the image processing procedure executed by the image processing apparatus 1G, the image compressed by the image processing apparatus 1C and the image processing procedure executed by the image processing apparatus 1C can be decoded.

Eighth Embodiment

Figure 17:
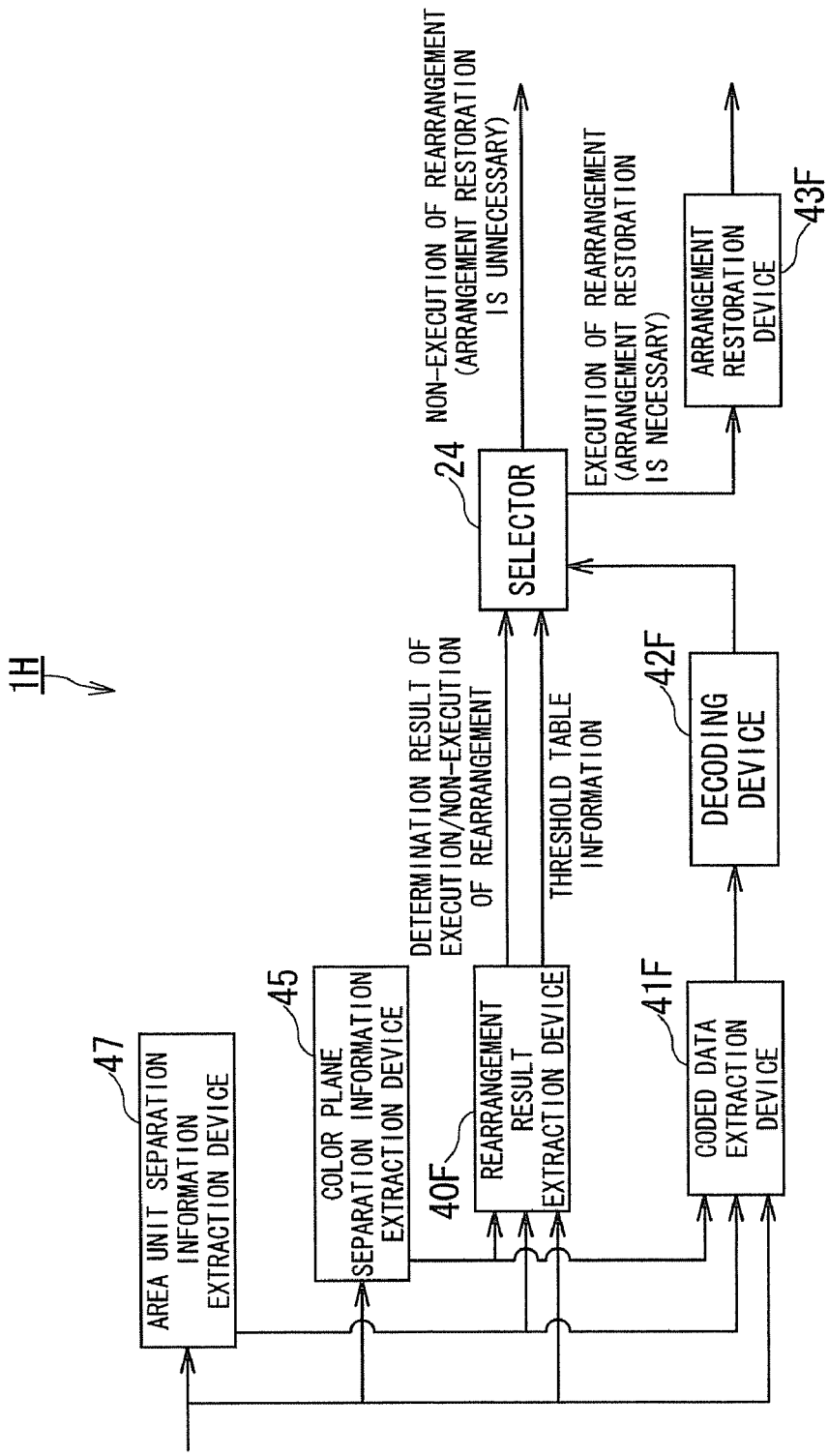
FIG. 17 is a view schematically illustrating a structure of an image processing apparatus of an eighth embodiment of the invention.

FIG. 17 is a schematic view schematically illustrating a structure of an image processing apparatus 1H as an example of an image processing apparatus of an eighth embodiment of the invention.

The image processing apparatus 1H is the apparatus having a function as an image data decompression device and corresponding to the image processing apparatus 1D functioning as a kind of image data compression device. Specifically, as shown in FIG. 17, the image processing apparatus 1H includes an area unit separation information extraction device 47, a color plane separation information extraction device 45, a rearrangement result extraction device 40F, a coded data extraction device 41F, a decoding device 42F, and an arrangement restoration device 43F. In other words, the image processing apparatus 1H is the apparatus configured such that the concept of the image processing apparatus 1G is applied to the image processing apparatus 1F.

Next, an image processing procedure of the image processing apparatus 1H carried out as an example of the image processing method of the invention will be described in brief.

Figure 18:
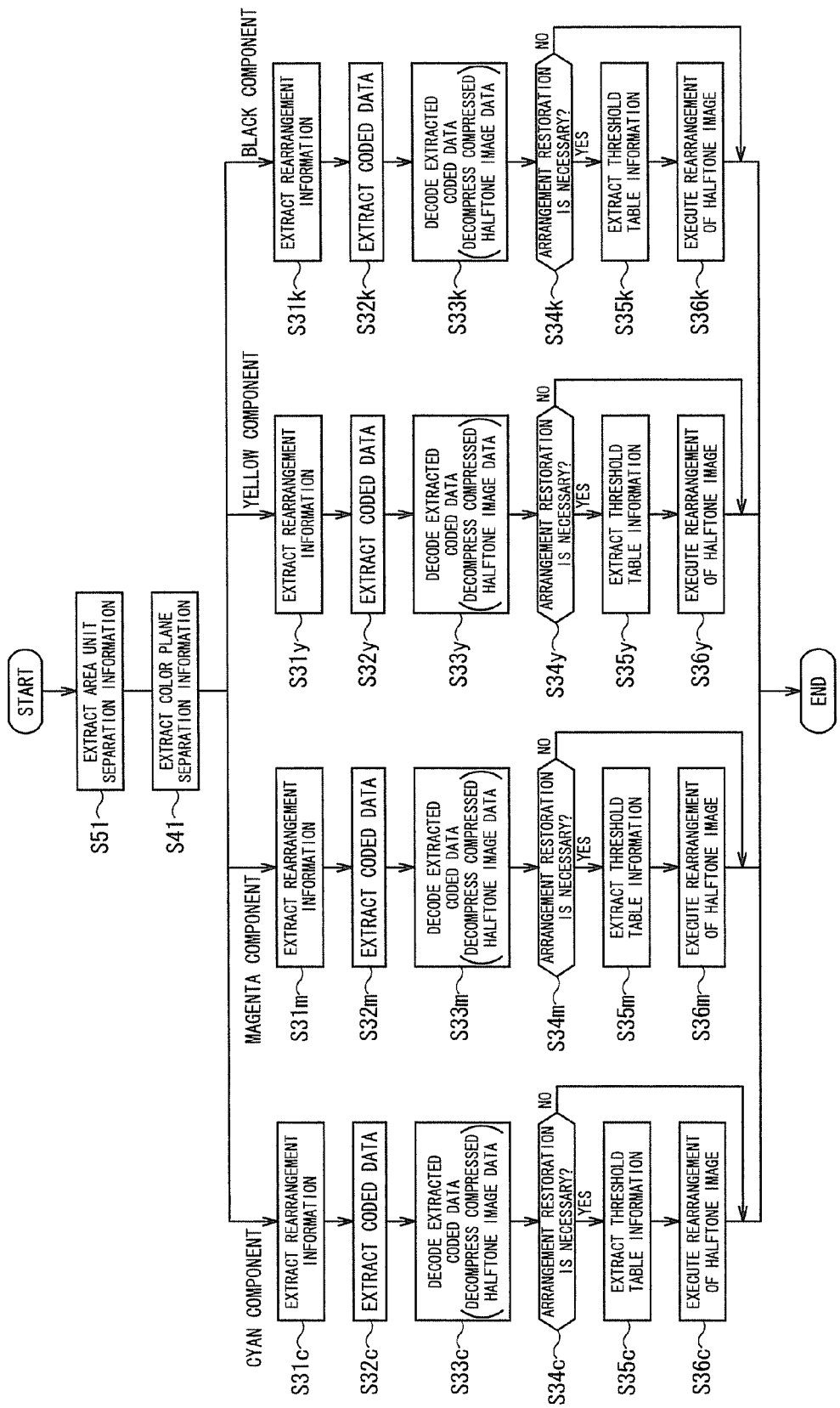
FIG. 18 is a process flow diagram for explaining an image processing procedure executed in the image processing apparatus of the eighth embodiment of the invention.

FIG. 18 is a process flow diagram for explaining an image processing procedure executed in the image processing apparatus 1H.

As shown in FIG. 18, the image processing procedure of the image processing apparatus 1H includes plural processing steps of decoding the coded data generated in the image processing procedure performed by the image processing apparatus 1D. That is, the image processing procedure of the image processing apparatus 1H further includes an area unit separation information extraction step (step S51) in the image processing procedure (FIG. 17) of the image processing apparatus 1G in addition to the fourth image processing procedure shown in FIG. 14. Incidentally, with respect to the area unit separation information extraction step, the color plane separation information extraction step (step S41), the rearrangement information extraction step (step S31) and the coded data extraction step (step S32), any one of them may be executed first, or they may be processed in parallel.

According to the image processing apparatus 1H configured as described above and the image processing procedure executed by the image processing apparatus 1H, the image compressed by the image processing apparatus 1D and the image processing procedure executed by the image processing apparatus 1D can be decoded.

According to the image processing apparatus and the image processing method of the invention as described above, the input image, for example, the image of 8 bits for each color of CMYK is subjected to the halftone process, the necessity of the rearrangement is determined for a plane of 1 bit necessary for each color, and when the rearrangement is necessary for each color plane, the rearrangement process is performed according to the pattern of the threshold table 28, 28B and coding is performed, and therefore, even in the compression system using the approximation of adjacent pixels in which a high compression efficiency can not be obtained, high compression can be realized.

Besides, with respect to such an image that the coding efficiency is reduced by the rearrangement, the rearrangement process is not performed, and therefore, even in the compression system using the approximation of adjacent pixels in which a high compression efficiency can not be obtained, high compression can be realized.

Further, the image compressed by the image processing apparatus and the image processing method can be decoded and used.

Incidentally, the invention is not limited to the embodiments as described above, but the components may be modified and embodied in an implementation phase within the scope not departing from the gist.

What is claimed is:

1. An image processing apparatus comprising:
    an image input device to convert image data into uncompressed data of C (Cyan), M (Magenta), Y (Yellow) and K (Black);
    a gradation processing device to perform a gradation process on the uncompressed data converted by the image input device and to generate a halftone image;
    a rearrangement determination device to determine necessity of rearrangement of pixels of the halftone image generated by the gradation processing device in accordance with whether the number of points where 0 and 1 are changed when the pixels in the halftone image are scanned, after rearranging the pixels of the halftone image by using a threshold table used at the time of performing the gradation process, is smaller than the number of points where 0 and 1 are changed when the pixels in the halftone image are scanned, before rearranging the pixels of the halftone image;
    a selector to select an output destination based on a rearrangement necessity determination result determined by the rearrangement determination device;
    a rearrangement device to rearrange the pixels by using a threshold table used at the time of performing the gradation process of the halftone image generated by the gradation processing device; and
    a coding device to output data obtained by coding data of the halftone image generated by the gradation processing device and data of the halftone image rearranged by the rearrangement device.

2. The image processing apparatus according to claim 1, further comprising a rearrangement information addition device to add information indicating whether the rearrangement device has performed the rearrangement of the pixels and information indicating the threshold table used at the time of the rearrangement to the data outputted by the coding device.

3. The image processing apparatus according to claim 1, wherein the gradation processing device, the rearrangement determination device, the selector, the rearrangement device and the coding device execute processes for each color plane of the CMYK.

4. The image processing apparatus according to claim 3, further comprising an information addition device to add, to the data outputted by the coding device, information indicating a separation between the color planes of the CMYK, information indicating whether the rearrangement device has performed the rearrangement of the pixels for each color plane of the CMYK, and information indicating the threshold table for each color plane of the CMYK used at the time of the rearrangement.

5. The image processing apparatus according to claim 1, further comprising:
    a rearrangement result extraction device to extract information indicating whether the rearrangement device has performed the rearrangement of the pixels from the data as a processing object;
    a coded data extraction device to extract coded data from the data as the processing object;
    a decoding device to decode the coded data extracted by the coded data extraction device;
    a selector to select an output destination of the data decoded by the decoding device based on information of a determination result received from the rearrangement result extraction device and indicating whether the rearrangement has been performed; and
    an arrangement restoration device to restore, based on threshold table information received from the selector, the pixels of the halftone image expressed by the data decoded by the decoding device into a state before the rearrangement.

6. An image forming apparatus comprising:
    an image processing apparatus to perform an image processing including compression and decompression of an image;
    an image output apparatus to output an image;
    a memory to store electronic information;
    an interface apparatus having a function as a man-machine interface; and
    a controller to control the image processing apparatus, the interface apparatus, the image output apparatus and the memory;
    wherein the image processing apparatus comprises:
    an image input device to convert image data into uncompressed data of C (Cyan), M (Magenta), Y (Yellow) and K (Black);
    a gradation processing device to perform a gradation process on the uncompressed data converted by the image input device and to generate a halftone image;
    a rearrangement determination device to determine necessity of rearrangement of pixels of the halftone image generated by the gradation processing device in accordance with whether the number of points where 0 and 1 are changed when the pixels in the halftone image are scanned, after rearranging the pixels of the halftone image by using a threshold table used at the time of performing the gradation process, is smaller than the number of points where 0 and 1 are changed when the pixels in the halftone image are scanned, before rearranging the pixels of the halftone image;
    a selector to select an output destination based on a rearrangement necessity determination result determined by the rearrangement device;
    a rearrangement device to rearrange the pixels by using a threshold table used at a time of performing the gradation process of the halftone image generated by the gradation processing device; and
    a coding device to output data obtained by coding data of the halftone image generated by the gradation processing device and data of the halftone image rearranged by the rearrangement device.

7. The image forming apparatus according to claim 6, wherein the image processing apparatus further comprises a rearrangement information addition device to add information indicating whether the rearrangement device has performed the rearrangement of the pixels and information indicating the threshold table used at the time of the rearrangement to the data outputted by the coding device.

8. The image forming apparatus according to claim 6, wherein the gradation processing device, the rearrangement determination device, the selector, the rearrangement device and the coding device execute processes for each color plane of the CMYK.

9. The image forming apparatus according to claim 8, wherein the image processing apparatus further comprises an information addition device to add, to the data outputted by the coding device, information indicating a separation between the color planes of the CMYK, information indicating whether the rearrangement device has performed the rearrangement of the pixels for each color plane of the CMYK, and information indicating the threshold table for each color plane of the CMYK used at the time of the rearrangement.

10. The image forming apparatus according to claim 6, wherein the image processing apparatus further comprises
   a rearrangement result extraction device to extract information indicating whether the rearrangement device has performed the rearrangement of the pixels from the data as a processing object,
   a coded data extraction device to extract coded data from the data as the processing object,
   a decoding device to decode the coded data extracted by the coded data extraction device,
   a selector to select an output destination of the data decoded by the decoding device based on information of a determination result received from the rearrangement result extraction device and indicating whether the rearrangement has been performed, and
   an arrangement restoration device to restore, based on threshold table information received from the selector, the pixels of the halftone image expressed by the data decoded by the decoding device into a state before the rearrangement.

11. An image processing method comprising:
   converting inputted image data into uncompressed data of C (Cyan), M (Magenta), Y (Yellow) and K (Black);
   performing a gradation process on the converted uncompressed data to generate a halftone image;
   determining necessity of rearrangement of pixels of the halftone image generated in the gradation process in accordance with whether the number of points where 0 and 1 are changed when the pixels in the halftone image are scanned, after rearranging the pixels of the halftone image by using a threshold table used at the time of performing the gradation process, is smaller than the number of points where 0 and 1 are changed when the pixels in the halftone image are scanned, before rearranging the pixels of the halftone image;
   rearranging the pixels of the halftone image in a case where the rearrangement necessity determination result is that the rearrangement is necessary; and
   outputting data obtained by coding data of the halftone image generated in the gradation process and data of the halftone image in which the pixels are rearranged in the pixel rearrangement.

12. The image processing method according to claim 11, wherein data is generated in which information indicating whether the pixel rearrangement has been performed and information indicating which data table is the threshold table referred to at the time of the rearrangement are added to the coded data.

13. The image processing method according to claim 11, wherein the gradation process, the pixel rearrangement determination, the pixel rearrangement and the coding are executed for each color plane of the CMYK.

14. The image processing method according to claim 13, wherein data is generated in which information indicating a separation between the color planes of the CMYK, information indicating whether the rearrangement has been performed for each color plane of the CMYK, and information indicating which data table is the threshold table for each color plane of the CMYK referred to at the time of the rearrangement are added to the coded data.

15. The image processing method according to claim 11, wherein the image conversion, the gradation process, the pixel rearrangement determination, the pixel rearrangement and the coding are executed in units of a specified area including a plurality of pixels.

16. The image processing method according to claim 15, wherein data is generated in which information indicating a separation between the area units, information indicating whether the rearrangement of the pixels has been executed, and information indicating which data table is the threshold table referred to at the time of the rearrangement are added to the coded data.

17. The image processing method according to claim 11, wherein
   information indicating whether the rearrangement of the pixels has been performed is extracted from the data as a processing object,
   coded data is extracted from the data as the processing object,
   the extracted coded data is decoded,
   in a case where, based on information indicating whether the rearrangement of the pixels has been performed, it is determined that the rearrangement of the pixels has been performed, threshold table information necessary for specifying a used threshold table is extracted, and
   the pixels of the halftone image obtained by decoding the coded data are restored into a state before the rearrangement.

18. The image processing method according to claim 17, wherein information indicating a separation between color planes of the CMYK is extracted from the data as the processing object, and
   the rearrangement result extraction, the coded data extraction, the decoding, the threshold extraction, and the arrangement restoration are executed for each color plane of the CMYK.

19. The image processing method according to claim 17, wherein area unit separation information is extracted from the data as the processing object, and
   the rearrangement result extraction, the coded data extraction, the decoding, the threshold extraction, and the arrangement restoration are executed in units of a specified area based on the area unit separation information.

* * * * *